United States Patent
Hirayama

(10) Patent No.: US 12,263,881 B2
(45) Date of Patent: Apr. 1, 2025

(54) VEHICLE-MOUNTED CAMERA DEVICE AND METHOD OF GENERATING A DISPLAY IMAGE

(71) Applicant: DENSO TEN Limited, Kobe (JP)

(72) Inventor: Kenta Hirayama, Kobe (JP)

(73) Assignee: DENSO TEN Limited, Kobe (JP)

( * ) Notice: Subject to any disclaimer, the term of this patent is extended or adjusted under 35 U.S.C. 154(b) by 191 days.

(21) Appl. No.: 18/018,963

(22) PCT Filed: Aug. 6, 2020

(86) PCT No.: PCT/JP2020/030149
§ 371 (c)(1),
(2) Date: Jan. 31, 2023

(87) PCT Pub. No.: WO2022/029953
PCT Pub. Date: Feb. 10, 2022

(65) Prior Publication Data
US 2023/0311990 A1 Oct. 5, 2023

(51) Int. Cl.
*B62D 15/02* (2006.01)
*B60R 1/22* (2022.01)
*H04N 7/18* (2006.01)
*H04N 23/667* (2023.01)

(52) U.S. Cl.
CPC ........... *B62D 15/0295* (2013.01); *B60R 1/22* (2022.01); *H04N 7/18* (2013.01); *H04N 23/667* (2023.01)

(58) Field of Classification Search
CPC ......... B62D 15/0295; B60R 1/22; B60R 1/00; B60R 99/00; H04N 7/18; H04N 7/183; H04N 23/667; H04N 23/90

USPC ......................................... 701/41, 42, 43, 44
See application file for complete search history.

(56) References Cited

FOREIGN PATENT DOCUMENTS

| JP | 2016055793 | * | 4/2016 | ............ B60R 21/00 |
|----|-----------|---|--------|------------------------|
| JP | 6541318 B2 | * | 7/2019 | ............ B60R 99/00 |
| JP | 2020123283 | * | 8/2020 | ............ G06T 1/20 |
| WO | 2012/032809 A1 | | 3/2012 | |

OTHER PUBLICATIONS

Sep. 24, 2020 Search Report issued in International Patent Application No. PCT/JP2020/030149.

* cited by examiner

*Primary Examiner* — Hai H Huynh
(74) *Attorney, Agent, or Firm* — Oliff PLC

(57) ABSTRACT

A vehicle-mounted camera device mounted on a vehicle includes a main core that generates a guide line image including a guide line in accordance with the steering angle of the vehicle, a sub core that superposes a guide line image on a reference image based on the capturing result from a camera mounted on the vehicle, thereby to output the resulting reference image to a display device as a display image, and a memory that holds a plurality of guide line images generated in the main core with respect to a plurality of steering angle. The sub core reads from the memory, in accordance with steering angle information indicating the current steering angle of the vehicle, one of the plurality of guide line images to generate a display image using the read guide line image.

9 Claims, 12 Drawing Sheets

PARKING ASSIST FUNCTION

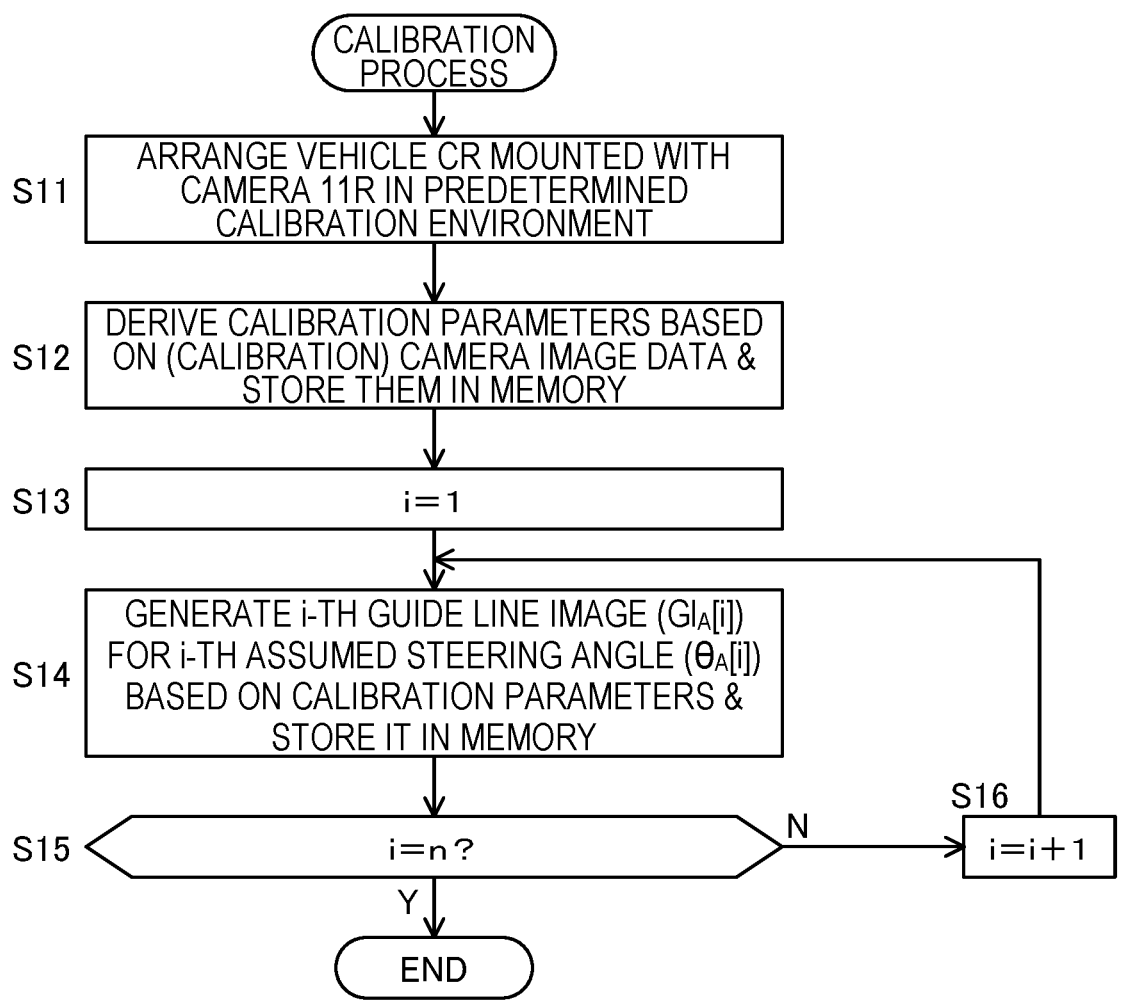

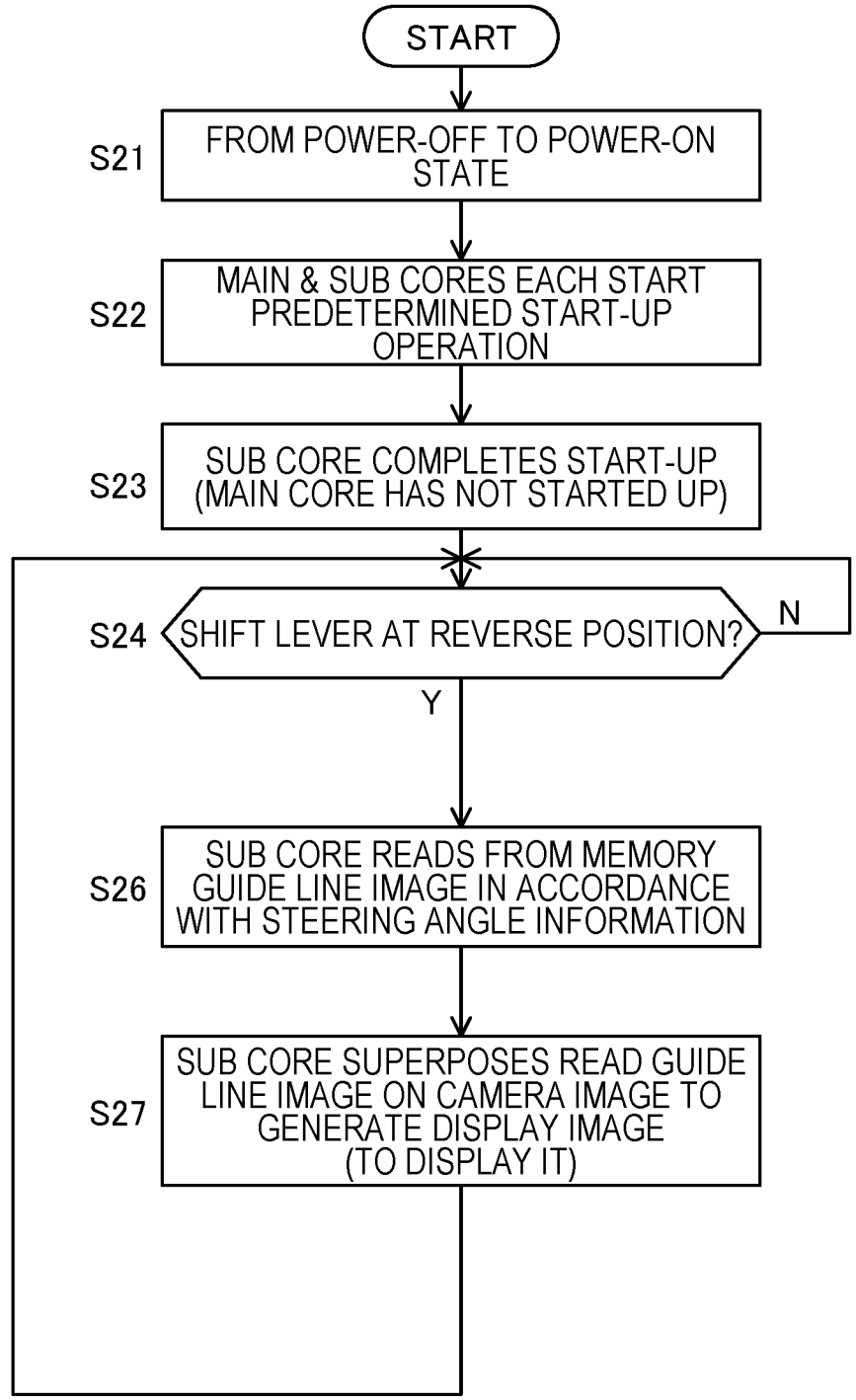

NORMAL MODE

VEHICLE-MOUNTED CAMERA DEVICE AND METHOD OF GENERATING A DISPLAY IMAGE

TECHNICAL FIELD

The present invention relates to a vehicle-mounted camera device and to a method of generating a display image.

BACKGROUND ART

Driving assist methods for assisting driving operation during parking and the like are in practical use. As one kind of such driving assist methods, there is known a method of displaying a guide line indicating a predicted movement path of a vehicle calculated based on the steering angle of the vehicle, in a form superposed on a captured image from a vehicle-mounted camera.

LIST OF CITATIONS

Patent Literature

[Patent Document 1] WO/2012/032809

SUMMARY OF THE INVENTION

Problem to be Solved by the Invention

A guide line depends on the steering angle of a vehicle, and drawing the guide line in accordance with the steering angle requires comparatively heavy arithmetic processing. Thus, a reference method as described below is studied. In a reference vehicle-mounted camera device according to the reference method, in the calibration procedure for the device, a calibration computer for drawing guide lines is separately prepared, and it is made to draw guide lines for different steering angles respectively. Meanwhile, calibration parameters with consideration given to the fitting position and angle of the camera with respect to the vehicle are generated, and accurate guide lines are drawn with reference to the calibration parameters. The data of the guide lines drawn by the calibration computer are stored in a non-volatile manner in a memory in the reference vehicle-mounted camera device. Then, in the reference vehicle-mounted camera device, the guide line image corresponding to the actual steering angle of the vehicle is read from the memory, and the display image is generated by superposing the read guide line image on a camera image.

With this reference method, inconveniently, once a camera is fitted to a vehicle, in case of a change in the arrangement of the camera or a change in the model of the vehicle to which the camera is fitted, it is not possible to adjust the guide line (adjustment of the guide line through generation of new calibration parameters) without the help of the calibration computer mentioned above.

An object of the present invention is to provide a vehicle-mounted camera device that can display a guide line and that is convenient to use, and to provide a method of generating a display image.

Means for Solving the Problem

According to one aspect of the present invention, a vehicle-mounted camera device mounted on a vehicle includes a first processor configured to generate a guide line image including a guide line in accordance with a steering angle of the vehicle, a second processor configured to superpose the guide line image on a reference image based on a capturing result from a camera mounted on the vehicle, to output the resulting reference image to a display device as a display image, and a memory that holds a plurality of guide line images generated in the first processor with respect to a plurality of steering angles. The second processor, in accordance with steering angle information indicating the current steering angle of the vehicle, reads from the memory one of the plurality of guide line images to generate the display image using the read guide line image (a first configuration).

In the vehicle-mounted camera device according to the first configuration described above, preferably, when the vehicle-mounted camera device switches from a power-off state to a power-on state, of the first and second processors, the second processor completes start-up first. Before the first processor completes start-up, the second processor reads from the memory one of the plurality of guide line images in accordance with the steering angle information to generate the display image using the read guide line image. After the first processor completes start-up, the first or second processor generates the display image using the guide line image generated in accordance with the steering angle information in real time in the first processor (a second configuration).

In the vehicle-mounted camera device according to the second configuration described above, preferably, when, with the vehicle in a stationary state, the vehicle-mounted camera device switches from the power-on state to the power-off state, the first processor performs holding processing, before switching to the power-off state. The first processor, in the holding processing, sets a range smaller than a variable range of the steering angle of the vehicle based on the steering angle information with the vehicle in the stationary state, generates two or more guide line images with respect to the two or more steering angles within the set range, and holds in the memory the two or more guide line images as the plurality of guide line images (a third configuration).

In the vehicle-mounted camera device according to the second or third configuration described above, preferably, the amount of information of each of the guide line images held in the memory is smaller than the amount of information of the guide line image that can be generated by the first processor after the first processor completes start-up (a fourth configuration).

In the vehicle-mounted camera device according to any of the second to fourth configurations described above, preferably, the number of kinds of guide line images held in the memory is smaller than the number of kinds of guide line images that can be generated by the first processor after the first processor completes start-up (a fifth configuration).

In the vehicle-mounted camera device according to the first or second configuration described above, preferably, the plurality of guide line images held in the memory include guide line images in a first guide line image group with respect to a first steering angle group and guide line images in a second guide line image group with respect to a second steering angle group. The first steering angle group includes a plurality of first steering angles. The second steering angle group includes a plurality of second steering angles that result from discretization at predetermined angular intervals smaller than angular intervals of the plurality of first steering angles. When, with the vehicle in the stationary state, the vehicle-mounted camera device switches from the power-on state to the power-off state, the first processor performs holding processing before switching to the power-off state.

The first guide line image group is held in the memory in advance before the holding processing. The first processor, in the holding processing, sets a range smaller than a variable range of the steering angle of the vehicle based on the steering angle information with the vehicle in the stationary state, sets in the set range two or more steering angles at the predetermined angular intervals as the second steering angle group, generates two or more guide line images with respect to the two or more steering angles, and holds in the memory the two or more guide line images as the second guide line image group (a sixth configuration).

In the vehicle-mounted camera device according to the sixth configuration described above, preferably, the amount of information of each of the guide line images in the second guide line image group is larger than the amount of information of each of the guide line images in the first guide line image group (a seventh configuration).

According to another aspect of the present invention, a method of generating a display image used in a vehicle-mounted camera device which is mounted on a vehicle and which includes a first processor, a second processor, and a memory includes a first step in which the first processor generates a guide line image including a guide line in accordance with a steering angle of the vehicle, a second step in which the second processor superposes the guide line image on a reference image based on a capturing result from a camera mounted on the vehicle, to output the resulting reference image to a display device as the display image, and a third step in which the memory holds a plurality of guide line images generated in the first step with respect to a plurality of steering angles. In the second step, in accordance with steering angle information indicating the current steering angle of the vehicle, one of the plurality of guide line images are read from the memory to generate the display image using the read guide line image (an eighth configuration).

Advantageous Effects of the Invention

According to the present invention, it is possible to provide a vehicle-mounted camera device that can display a guide line and that is convenient to use, and to provide a method of generating a display image.

BRIEF DESCRIPTION OF DRAWINGS

FIG. 8 is a flow chart of a calibration procedure in a calibration mode according to a first practical example of the present invention.

FIG. 9 is a flow chart of the operation of the vehicle-mounted camera device in a normal mode according to the first practical example of the present invention.

DESCRIPTION OF EMBODIMENTS

Hereinafter, examples embodying the present invention will be described specifically with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, members, and the like are occasionally used with omission or abbreviation of the names of the information, signals, physical quantities, members, and the like corresponding to those symbols and reference signs.

Figure 1:
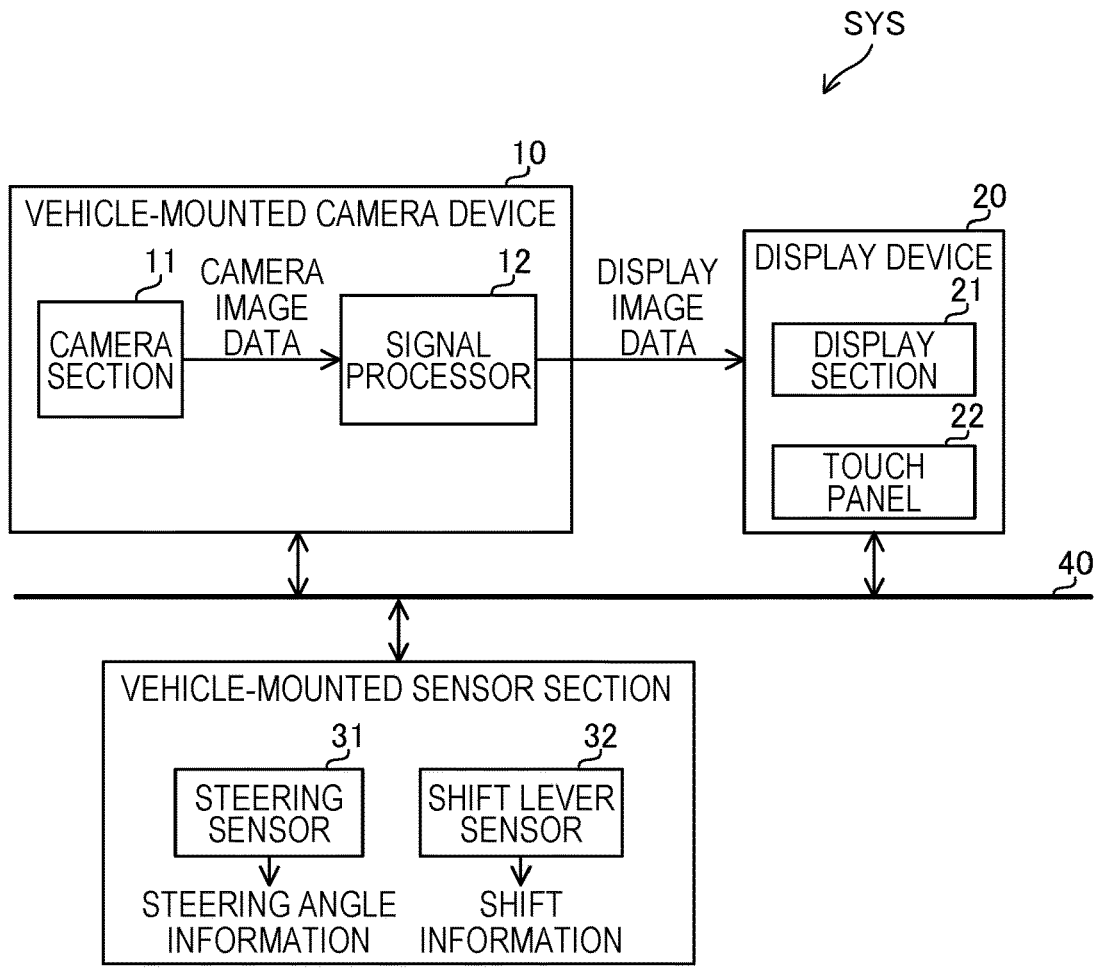
FIG. 1 shows an overall configuration of a vehicle-mounted system according to an embodiment of the present invention.
Figure 2:
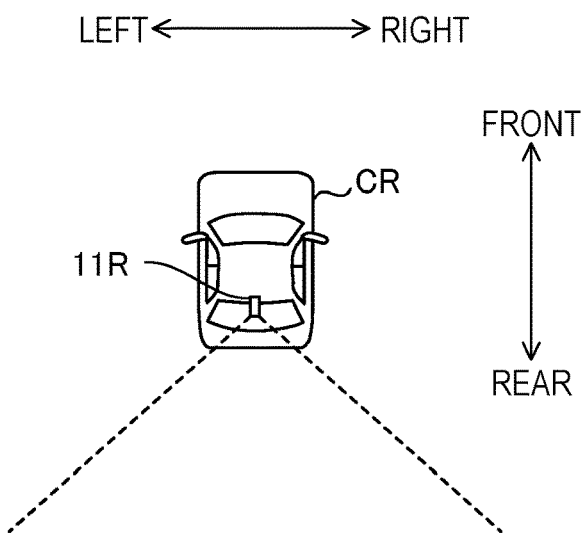
FIG. 2 is a schematic top view of a vehicle mounted with the vehicle-mounted system according to the embodiment of the present invention.
Figure 3:
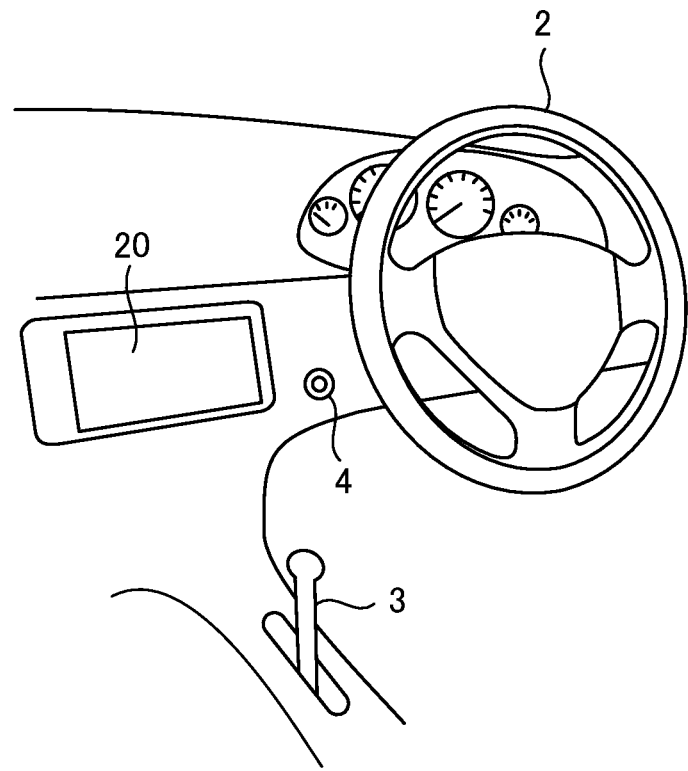
FIG. 3 is a diagram showing part of the cabin of the vehicle according to the embodiment of the present invention.

FIG. 1 shows an overall configuration of a vehicle-mounted system SYS according to an embodiment of the present disclosure. The vehicle-mounted system SYS includes a vehicle-mounted camera device 10, a display device 20, and a vehicle-mounted sensor section 30. FIG. 2 is a schematic top view of a vehicle CR mounted with the vehicle-mounted system SYS. FIG. 3 shows part of the cabin of the vehicle CR. Provided near the driver's seat in the cabin of the vehicle CR are a steering wheel 2, a shift lever 3, and an ignition switch 4 as components to be operated by a driver as well as the display device 20 to be viewed by the driver.

The steering wheel 2 is a ring-form part which is rotated by the driver to control the traveling direction of the vehicle CR in accordance with how it is rotated. The shift lever 3 is operated by the driver to set whether or not to run the vehicle CR, to set the direction in which to run the vehicle CR, and to change the gears of the vehicle CR. The ignition switch 4 is operated by the driver to specify whether or not to supply electric power to electric equipment on the vehicle CR and to start or stop the engine of the vehicle CR. The electric power supplied to the electric equipment on the vehicle CR is referred to as ACC power. The vehicle-mounted camera device 10 and the display device 20 belong to the electric equipment.

The vehicle-mounted camera device 10 is in either a power-on state or a power-off state. The power-on state refers to a state where ACC power is fed to the vehicle-mounted camera device 10 so that the vehicle-mounted camera device 10 can operate from ACC power. The power-off state refers to a state where no ACC power is fed to the vehicle-mounted camera device 10 or a state where, even though ACC power is fed to the vehicle-mounted camera device 10, an enable signal fed to the vehicle-mounted camera device 10 is in a negated state and the vehicle-mounted camera device 10 is not started up.

The vehicle-mounted camera device 10, the display device 20, and the vehicle-mounted sensor section 30 are connected to an in-vehicle network 40 formed within the vehicle CR, and can transmitted to and receive from each other any information and signals via the in-vehicle network 40. As the in-vehicle network 40, a CAN (controller area network) can be used. While, in FIG. 1, as components connected to the in-vehicle network 40, only the vehicle-mounted camera device 10, display device 20, and vehicle-mounted sensor section 30 are shown, other than these, various unillustrated devices (for example, a power steering system, a brake system, a radar device, a drive recorder, and the like) are connected to the in-vehicle network 40.

As the vehicle CR, a vehicle (such as an automobile) that can travel on a road is mainly assumed, but the vehicle CR can be any type of vehicle. In the vehicle CR, the direction pointing from the driver's seat to the steering wheel 2 is defined as frontward, and the direction pointing from the steering wheel 2 to the driver's seat is defined as rearward. The direction that is perpendicular to the front-rear direction and parallel to the road surface is defined as the left-right direction. With respect to the left-right direction, left and right are assumed to be the left and right as seen from the driver of the vehicle CR sitting, facing ahead, in the driver's seat of the vehicle CR.

The vehicle-mounted camera device 10 includes a camera section 11 and a signal processor 12. The camera section 11 is composed of one or more cameras provided on the vehicle CR, and each camera included in the camera section 11 is referred to as a unit camera. The unit camera includes an image sensor, such as a CMOS (complementary metal-oxide-semiconductor) image sensor or a CCD (charge-coupled device) image sensor, along with an optical system, and captures an image in its field of view (in other words, in the capturing area) to generate image data representing the image obtained by capturing (that is, an image within the field of view). Hereinafter, image data generated by the unit camera is referred to as camera image data, and a two-dimensional image represented by camera image data is referred to as a camera image. Camera image data generated by the unit camera is fed to a signal processor 12. The unit camera repeatedly captures its field of view periodically at a predetermined capturing frame rate. The capturing frame rate corresponds to the number of times of capturing per second. While any capturing frame rate can be used, it can be, for example, 60 [frames/second]. In the unit camera, camera image data corresponding to one frame is generated periodically at an interval equal to the reciprocal of the capturing frame rate and is transmitted to a signal processor 12. Camera image data corresponding to one frame represents a camera image in the form of one still image, and camera image corresponding to a plurality of frames represents a camera image in the form of a moving image.

In the camera section 11, a camera 11R is provided as one of the unit cameras (see FIG. 2). The camera 2R is a rear camera that has a field of view in an area rearward of the vehicle CR and is installed at a suitable position on the body of the vehicle CR. Although not clear from FIG. 2, the depression angle of the camera 11R is set appropriately so that the road surface in a predetermined area rearward of the vehicle CR is included in the field of view of the camera 11R. For example, the depression angle of the camera 11R is set at 30° so that the road surface in an area up to 8 m rearward of the vehicle CR from the rear end of the vehicle CR is included in the field of view of the camera 11R. While the camera 11R can be given any horizontal angle of view, it is preferred that a wide-angle lens be used to give the camera 11R a horizontal angle of view of, for example, 100° to 200°.

The camera section 11 may include, in addition to the camera 11R as a rear camera, a front camera having a field of view in an area frontward of the vehicle CR, a right camera having a field of view in an area rightward of the vehicle CR, and a left camera having a field of view in an area leftward of the vehicle CR. The front camera, right camera, and left camera are each a kind of unit camera, and camera image data from each unit camera is fed to the signal processor 12. Of the rear camera, front camera, right camera, and left camera, any one or more may be provided in the camera section 11. In this embodiment, with focus on the camera 11R provided in the camera section 11, how to use the capturing results from the camera 11R will be described.

The signal processor 12 will perform necessary signal processing on camera image data to generate display image data. Display image data is fed to the display device 20. Display image data is image data that represents a two-dimensional display image.

The display device 20 includes a display section 21 and a touch panel 22 formed in the display section 21. The display section 21 is a liquid crystal display panel or the like and displays a display image provided from the vehicle-mounted camera device 10 (signal processor 12). The touch panel 22 is an example of a man-machine interface that receives input operation by an operator. A signal that represents what is intended by input operation on the touch panel 22 is, via the in-vehicle network 40, transmitted to a device (which can be the vehicle-mounted camera device 10) that is to receive the signal. The operator of the touch panel 22 is typically the driver of the vehicle CR, but it can be anyone other than the driver (for example, a passenger of the vehicle CR, sales staff of a vehicle store, a worker of a factory). The display device 20 is installed in front of the driver's seat in the cabin of the vehicle CR so that the driver of the vehicle CR can view what is displayed on the display section 21. The display device in a navigation system mounted on the vehicle CR can be used as the display device 20.

The vehicle-mounted sensor section 30 is composed of a plurality of sensors mounted on the vehicle CR. FIG. 1 shows, of the plurality of sensors, two sensors, namely a steering sensor 31 and a shift lever sensor 32.

The steering sensor 31 is a sensor for sensing the amount of steering (rotating angle) of the steering wheel 2 of the vehicle CR and is configured with, for example, a Hall device. The steering angle of the vehicle CR sensed by the steering sensor 31 is represented by the symbol "θ". The vehicle-mounted camera device 10 can acquire, via the in-vehicle network 40, steering angle information representing the steering angle θ sensed by the steering sensor 31. Steering angle information represents the current steering angle θ (in other words, actual steering angle θ) of the vehicle CR, and is updated at a predetermined update period.

The shift lever sensor 32 is a sensor for sensing the position of the shift lever 3 of the vehicle CR and is configured with, for example, a displacement sensor. The shift lever 3 is, based on the operation of the driver, set at one of a plurality of positions including a drive position and a reverse position. When the shift lever 3 is at the drive position, the vehicle CR travels forward (runs frontward) in accordance with the amount of stepping on an accelerator pedal of the vehicle CR, and, when the shift lever 3 is at the reverse position, the vehicle CR travels backward (runs rearward) in accordance with the amount of stepping on the accelerator pedal of the vehicle CR. Information indicating the position of the shift lever 3 sensed by the shift lever sensor 32 is referred to as shift information. The vehicle-mounted camera device 10 can acquire shift information via the in-vehicle network 40.

Any other various sensors (for example, a speed sensor, an accelerator sensor, and a brake sensor) mounted on the vehicle CR can be included in the vehicle-mounted sensor section 30, and information acquired from those sensors may be transmitted to the vehicle-mounted camera device 10 via the in-vehicle network 40.

Figure 4:
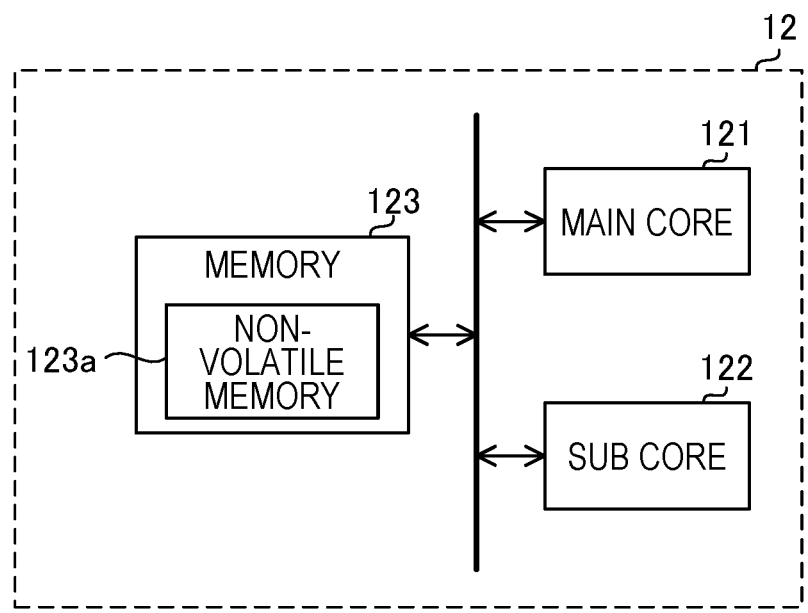
FIG. 4 shows an outline of the internal configuration of a signal processor according to the embodiment of the present invention.

FIG. 4 shows an outline of the internal configuration of the signal processor 12. The signal processor 12 includes a main core 121, a sub core 122, and a memory 123. The signal processor 12 can be configured as an SoC (system-on-a-chip) including the main core 121, the sub core 122, and the memory 123. The main core 121 is a first processor incorporating a GPU (graphics processing unit). On the other hand, the sub core 122 is a second processor incorporating no GPU.

The memory 123 is composed of a ROM (read-only memory) and a RAM (a random-access memory) and is shared by the main core 121 and the sub core 122. That is, the main core 121 and the sub core 122 can, as necessary, write data to and read data from the memory 123 via an unillustrated memory controller. The memory 123 includes a non-volatile memory 123a that can hold stored data even if the supply of electric power to the signal processor 12 is cut off.

The vehicle-mounted camera device 10 has a driving assist function that assists the driving of the vehicle CR and, when the shift lever 3 of the vehicle CR is at the reverse position, performs a parking assist function (in other words, a backward movement assist function) as a kind of driving assist function.

Figure 5:
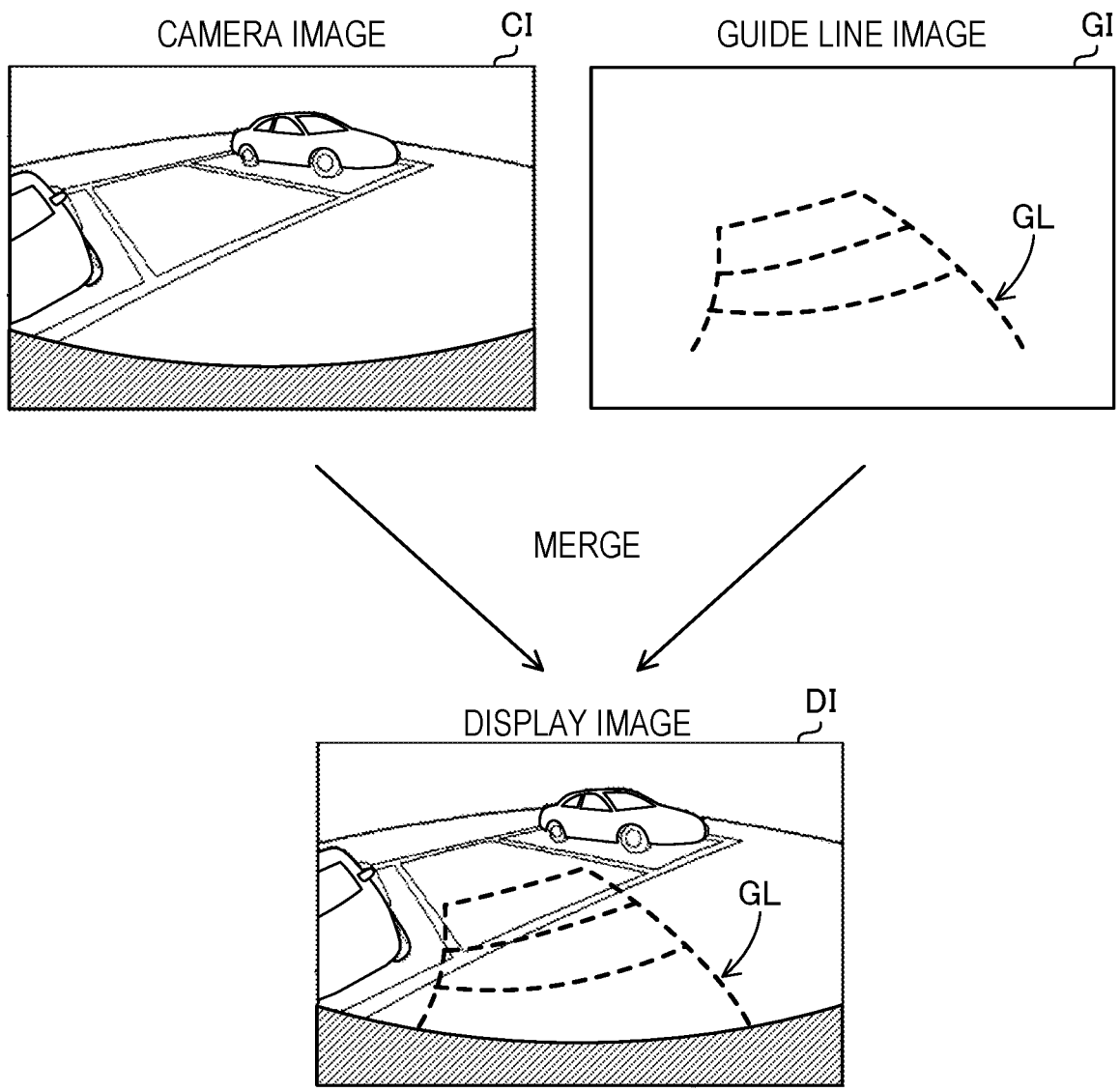
FIG. 5 is a diagram illustrating a parking assist function according to the embodiment of the present invention.

With reference to FIG. 5, the parking assist function will be described. FIG. 5 shows an example of the camera image and the display image with the shift lever 3 set at the reverse position. In some diagrams including FIG. 5 and in the following description, the camera image and the display image may be referred to by the symbols "CI" and "DI" respectively. In the parking assist function (that is, with the shift lever 3 set at the reverse position), the vehicle-mounted camera device 10 can merge a guide line image GI including a guide line GL into the camera image CI from the camera 11R and have the display device 20 display the merged image as the display image DI. The merging of the guide line image GI into the camera image CI is achieved by superposing the guide line image GI on the camera image CI, and the camera image CI having the guide line image GI superposed on it is the display image DI. Superposing the guide line image GI on the camera image CI results in the guide line GL being superposed on the camera image CI; thus, superposing the guide line image GI on the camera image CI can be understood as corresponding to or including superposing the guide line GL on the camera image CI.

The guide line GL is a line (predicted course line) that predicts positions or an area through which the vehicle CR passes when it moves backward and that indicates the positions and area on the image space in which the camera image CI is defined. The guide line GL may include a line that indicates a predicted movement path of the vehicle CR when it moves backward. When the vehicle CR moves backward, the positions or area through which the vehicle CR passes change depending on the steering angle θ. Thus, the guide line GL is created in accordance with the steering angle θ.

Figure 6:
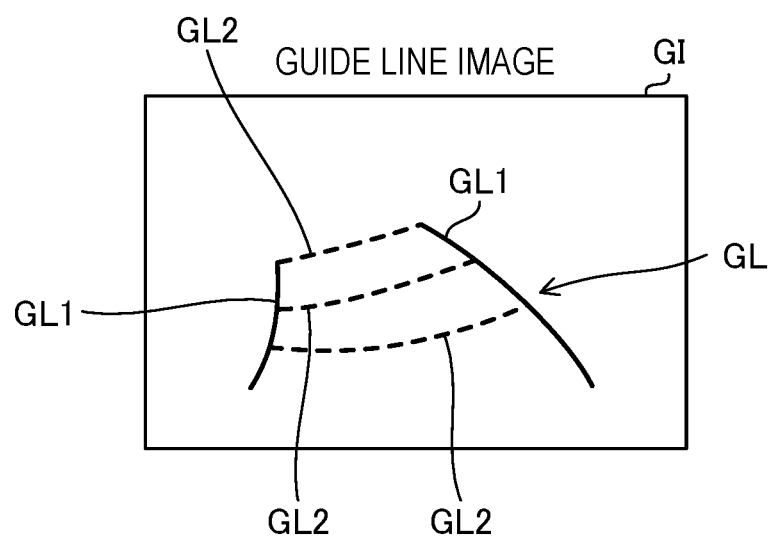
FIG. 6 is a diagram showing an example of guide line images generated by the parking assist function according to the embodiment of the present invention.

As shown in FIG. 6, the guide line GL includes two main lines GL1 and one or more auxiliary lines GL2 (in the example of FIG. 6, three auxiliary lines GL2). In FIG. 6, for convenience' sake, the main lines GL1 are indicated by solid lines and the auxiliary lines GL2 are indicated by broken lines. Of the two main lines GL1, one main line GL1 indicates a predicted movement path along which the right rear corner of the body of the vehicle CR moves when the vehicle CR drives backward, and the other main line GL1 indicates a predicted movement path along which the left rear corner of the body of the vehicle CR moves when the vehicle CR drives backward. In the guide line image GI, the rear end of the body of the vehicle CR is indicated by a line with a length equivalent to the width of the vehicle CR, and the line indicating the predicted positions of the rear end while the vehicle CR is moving backward corresponds to the auxiliary line GL2. The auxiliary lines GL2 are drawn as lines that connect between the main lines GL1 and GL2.

The guide line image GI may include image information other than the guide line GL; it may include, in addition to the guide line GL, extension lines of the vehicle, a message image, and the like. The extension lines of the vehicle (not shown) are rearward vehicle-width extension lines that simply extend rearward the left and right ends of the vehicle CR. The extension lines of the vehicle do not depend on the steering angle θ, and thus, if the extension lines of the vehicle are included in the guide line image GI, they are superposed at predetermined positions on the camera image IC.

Figure 7A:
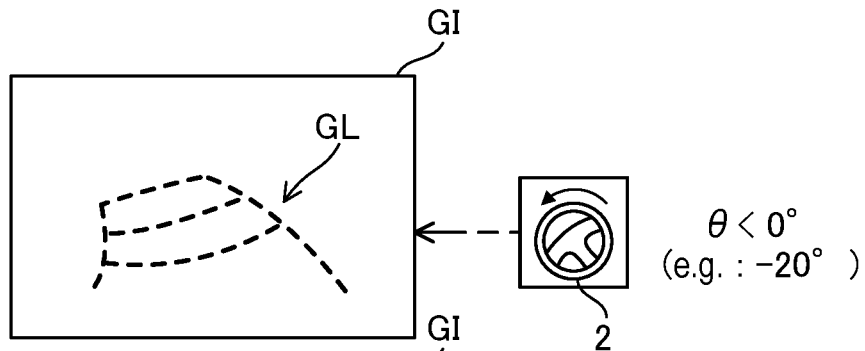
FIGS. 7A to 7E are diagrams illustrating how the guide line changes in accordance with the steering angle of the vehicle according to the embodiment of the present invention.
Figure 7B:
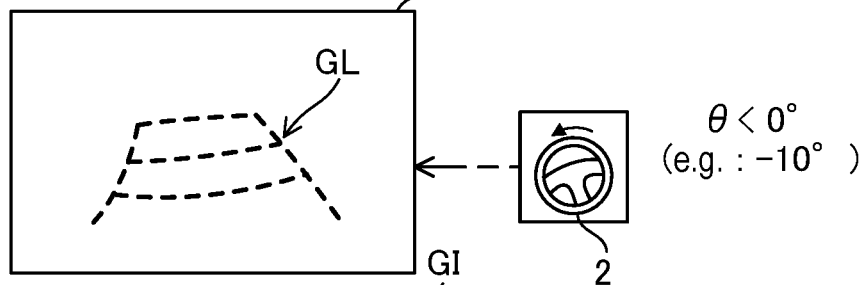
Figure 7C:
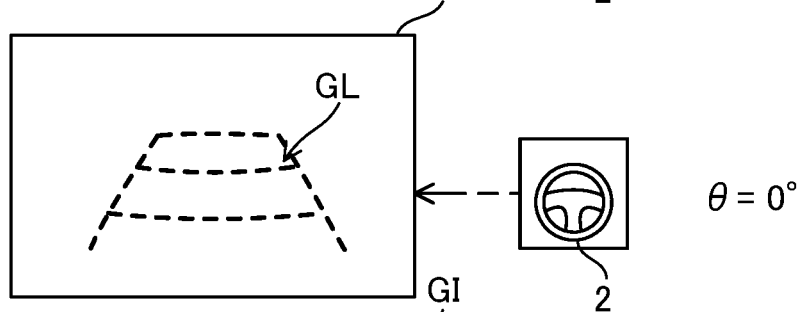

As shown in FIG. 7C, when the steering wheel 2 is at a neutral position (predetermined middle position), the steering angle θ is zero, and the guide line GL is drawn at a position almost overlapping the extension lines of the vehicle described above. Here, it is assumed that, when the steering wheel 2 is at the neutral position, the steering angle θ is zero. It is also assumed that, relative to the neutral position of the steering wheel 2, when the steering wheel 2 is rotated to the right (clockwise as seen from the driver), the steering angle θ is positive and, when the steering wheel 2 is rotated to the left (counter-clockwise as seen from the driver), the steering angle θ is negative.

Figure 7D:
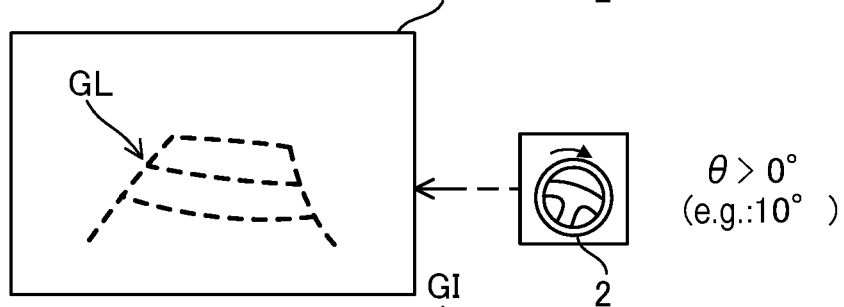
Figure 7E:
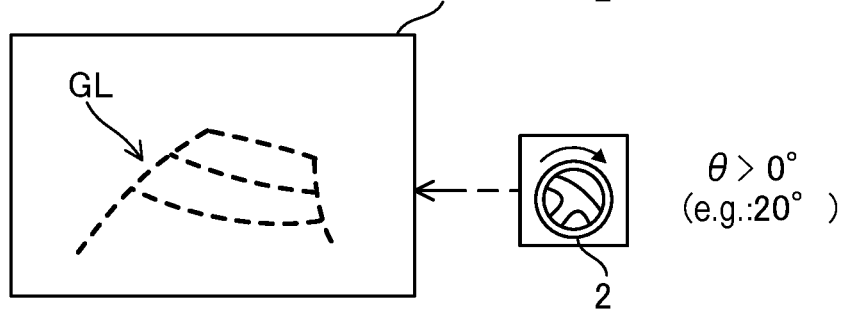

As shown in FIG. 7B, when the steering wheel 2 is rotated a little to the left from the neutral position (for example, when θ=−10°), the guide line GL is curved leftward compared to when the steering angle θ is zero. When the steering wheel 2 is rotated further to the left from the state in FIG. 7B (for example, when θ=−20°), as shown in FIG. 7A, the guide line GL is curved further leftward. As shown in FIG. 7D, when the steering wheel 2 is rotated a little to the right from the neutral position (for example, when θ=10°), the guide line GL is curved rightward compared to when the steering angle θ is zero. When the steering wheel 2 is rotated further to the right from the state in FIG. 7D (for example, θ=20°), as shown in FIG. 7E, the guide line GL is curved further rightward.

When a driver views the display device 20 arranged in front of the driver's seat, a view similar to that in an unillustrated rear view mirror would make it easier for the driver to understand the condition around the vehicle CR; accordingly, it is preferable that, in the display image DI, the camera image CI be displayed as a mirror image with the left and right inverted (that is, an image produced by mirror-inverting the captured image from the camera 11R can be displayed on the display device 20 as the camera image CI in the display image DI). In this case, also the guide line GL superposed on the camera image CI is drawn as a mirror image.

Hereinafter, by way of a plurality of practical examples, specific examples of the above configurations will be described along with applied technologies, modified technologies, and the like. Unless otherwise stated or unless inconsistent, any features described above in connection with the embodiment apply to the practical examples described below. For any features of the practical examples that contradict what has been described above, their description given in connection with the practical examples may prevail. Unless inconsistent, any features of any of the plurality of practical examples can be applied to any other practical example (that is, any two or more of the plurality of practical examples can be implemented in any combination).

First Practical Example

A first practical example will be described. The vehicle-mounted camera device 10 operates in one of a plurality of modes including a calibration mode and a normal mode. An operation mode setter (not shown) that controls the mode in which the vehicle-mounted camera device 10 is to operate is included in the signal processor 12. When the vehicle-mounted camera device 10 switches from a power-off state to a power-on state, the vehicle-mounted camera device 10 in principle starts to operate in a normal mode. Then, when a predetermined operation is made on the touch panel 22, the operation mode of the vehicle-mounted camera device 10 is switched to the calibration mode by the operation mode setter; thereafter, the operation mode of the vehicle-mounted camera device 10 remains the calibration mode until it goes into the power-off state.

FIG. 8 is a flow chart of a calibration procedure. The calibration procedure is performed when the operation mode of the vehicle-mounted camera device 10 is set to the calibration mode. The calibration procedure is typically performed by a production worker at the manufacturing factory of the vehicle CR or by a staff member at the dealer of the vehicle CR. So long as a calibration environment described later can be prepared, a user of the vehicle-mounted system SYS (e.g., a driver of the vehicle CR) can perform the calibration procedure.

With respect to the fitting position and the angle of the camera 11R with respect to the vehicle CR, there may be a target position and a target angle, but the actual fitting position and the fitting angle of the camera 11R generally deviate more or less from the target position and angle. In the calibration procedure, calibration parameters based on the deviation of the actual fitting position and angle of the camera 11R from the target position and angle are obtained, and, based on the calibration parameters, a guide line image GI in accordance with the actual fitting position and angle of the camera 11R is generated. The guide line image GI is stored in the non-volatile memory 123a in the memory 123. Hereinafter, unless otherwise stated, storing the guide line image GI in the memory 123 refers to means storing the guide line image GI in the non-volatile memory 123a. The same applies with the calibration parameters, which will be discussed later. Now, with reference to FIG. 8, the calibration procedure will be described in detail.

In the calibration procedure, first, in step S11, the vehicle CR on which the camera 11R is installed is arranged in a predetermined calibration environment. In the calibration environment, the vehicle CR is arranged on a flat road surface for calibration. On the road surface for calibration, a plurality of markers that can be recognized by the camera 11R are arranged in the field of view (capturing area) of the camera 11R. The coordinate system of the image space in which the camera image CI is defined is referred to as the image coordinate system, and, for distinction from this, the coordinate system of the actual space in which the vehicle CR and the like are present is referred to as the world coordinate system. In the calibration environment, information needed to derive the calibration parameters, including, for example, information on the shape of the vehicle CR in the world coordinate system and information on the positional relationship between the vehicle CR and the markers in the world coordinate system, is given in advance to the signal processor 12 as known calibration information.

Subsequently to step S11, in step S12, the camera 11R captures the plurality of markers in the calibration environment, and image data of a camera image including the images of the plurality of markers is transmitted from the camera 11R to the signal processor 12 as calibration camera image data. In step S12, an unillustrated calibration parameter deriver in the signal processor 12 derives calibration parameters based on the calibration camera image data and the known calibration information mentioned above and stores the derived calibration parameters in the memory 123 (non-volatile memory 123a). The calibration parameter deriver may be a functional block implemented with the main core 121.

Calibration camera image data includes information dependent on the fitting position and angle of the camera 11R with respect to the vehicle CR. Correspondence between the image coordinate system and the world coordinate system is identified based on the calibration camera image data and the known calibration information. Parameters based on the identified correspondence are derived as the calibration parameters. Since calibration parameters as described above can be derived by a well-known method, no detailed description will be given of a deriving method or a deriving formula associated with it. By referring to the calibration parameters, the main core 121 can draw a guide line GL that is adapted to the fitting position and angle of the camera 11R with respect to the vehicle CR and that reflects the steering angle θ. Through the drawing of the guide line GL, a guide line image GI including the guide line GL is generated.

After step S12, the procedure proceeds to step S13. In step S13, the signal processor 12 substitutes "1" in a variable i, and the procedure proceeds to step S14. Here, i is a variable that takes any natural number.

In step S14, the main core 121, based on the calibration parameters, draws a guide line GL corresponding to the i-th assumed steering angle to generate the i-th guide line image GI including the guide line GL, and stores the i-th guide line image GI in the memory 123. Specifically, storing the i-th guide line image GI to the memory 123 means storing the image data of the i-th guide line image GI in the memory 123. The same applies with reading a guide line image, and also with storing and reading images other than a guide line image. The assumed steering angle indicates, not the value representing the actual steering angle θ of the vehicle CR, but an assumed value that can be taken by the steering angle θ of the vehicle CR. Hereinafter, the i-th assumed steering angle in the calibration procedure is referred to as the assumed steering angle $θ_A[i]$, and the i-th guide line image GI generated and stored during the calibration procedure is referred to as the guide line image $GI_A[i]$. The guide line image $GI_A[i]$ is, on the assumption that the actual steering angle θ of the vehicle CR is equal to the assumed steering angle $θ_A[i]$, a two-dimensional image including the guide line GL.

After step S14, the procedure proceeds to step S15. In step S15, the signal processor 12 checks whether or not the variable i is equal to a predetermined integer n. Here, n is any integer of two or more (for example, n=41). In step S15, unless "i=n", the procedure proceeds from step S15 to S16, where the variable i is incremented by one, and the procedure returns to step S14 to perform the processing in step S14 again. In step S15, if "i=n", the calibration procedure ends. When "i=n" and the calibration procedure ends, the guide line images $GI_A[1]$ to $GI_A[n]$ have been stored in the memory 123.

The assumed steering angles $θ_A[1]$ to $θ_A[n]$ each take a different value within the variable range of the steering angle θ of the vehicle CR. The variable range of the steering angle θ of the vehicle CR is the range of angles from a predetermined negative angle $θ_{L\_LIM}$ to a predetermined positive angle $θ_{R\_LIM}$. The assumed steering angles $θ_A[1]$ to $θ_A[n]$ may be set, by dividing the variable range of the steering angle θ simply at equal intervals, such that every two adjacent assumed steering angles have an equal interval. That is, the assumed steering angles $θ_A[1]$ to $θ_A[n]$ may be set by discretizing the variable range of the steering angle θ at even angular intervals. In this case, the resolution of allocation of the assumed steering angles $θ_A[1]$ to $θ_A[n]$ is even across the entire variable range of the steering angle θ. The assumed steering angles $θ_A[1]$ to $θ_A[n]$ may be set such that the resolution of their allocation is higher around where the steering angle θ is close to zero than elsewhere. That is, for example, in the range of angles equal to or larger than −4° but equal to or smaller than +4°, a total of nine assumed steering angles are set at intervals of 1°, and in the range of angles outside that range, the assumed steering angles may be set at intervals of 2°.

If, for example, "n=5", in the calibration procedure, five guide line images GI (five kinds of guide line images GI) as shown in FIGS. 7A to 7E are stored as the guide line images $GI_A[1]$ to $GI_A[5]$ in the memory 123, and the guide line images $GI_A[1]$ to $GI_A[5]$ include, for example, guide lines GL with "$θ=θ_A[1]=−20°$", "$θ=θ_A[2]=−10°$", "$θ=θ_A[3]=0°$", "$θ=θ_A[4]=10°$" and "$θ=θ_A[5]=20°$" respectively.

FIG. 9 is a flow chart of the operation of the vehicle-mounted camera device 10 in the normal mode according to the first practical example. The operation in the normal mode shown in FIG. 9 is performed after the calibration procedure in FIG. 8. That is, when the operation in FIG. 9 is started, the guide line images $GI_A[1]$ to $GI_A[n]$ have already been stored in the memory 123.

With reference to FIG. 9, the operation of the vehicle-mounted camera device 10 in the normal mode will be described. After the calibration procedure in FIG. 8 ends, the vehicle-mounted camera device 10 goes into the power-off state, and then, in step S21 in FIG. 9, the vehicle-mounted camera device 10 switches from the power-off state to the power-on state.

When the vehicle-mounted camera device 10 switches from the power-off state to the power-on state, in step S22, the main core 121 and the sub core 122 each start a predetermined start-up operation. In the main core 121, the start-up operation includes processing for initializing the states of the circuits in the main core 121, and, only after completion of the start-up operation can the main core 121 perform the functions (including the function of drawing the guide line GL) that are supposed to be performed by the main core 121. The same applies with the sub core 122.

Completion of the start-up operation in the main core 121 is referred to as start-up completion. The same applies with the sub core 122. The main core 121, which includes the GPU, is supposed to perform a larger variety of functions than the sub core 122; thus, for start-up completion, the main core 121 takes longer time than the sub core 122. For example, while the sub core 122 completes start-up in 0.2 seconds after the start of its start-up operation, the main core 121 completes start-up at the lapse of 5 seconds after the start of its start-up operation.

In this way, of the main core 121 and the sub core 122, the sub core 122 completes start-up first. In the flow chart in FIG. 9, in step S23 after step S22, the sub core 122 completes start-up, but in this step, the main core 121 has not completed start-up. After step S23, the procedure proceeds to step S24.

In step S24, the signal processor 12 (for example, the sub core 122) refers to shift information (see FIG. 1) from the shift lever sensor 32 to determine whether or not the shift lever 3 is at the reverse position. When the shift lever 3 is not at the reverse position, the processing in step S24 is repeated. When the shift lever 3 is at the reverse position, the procedure proceeds from step S24 to step S26, where the parking assist function described above (see FIG. 5) is performed. In the flow chart in FIG. 9, the parking assist function is achieved through the processing in steps S26 and S27.

In step S26, the sub core 122, based on the latest steering angle information acquired from the steering sensor 31, reads from the memory 123 the guide line image GI (one of the guide line images $GI_A[1]$ to $GI_A[n]$) in accordance with the current steering angle θ of the vehicle CR. That is, the sub core 122 identifies, of the assumed steering angles $θ_A[1]$ to $θ_A[n]$, the assumed steering angle closest to the current steering angle θ of the vehicle CR, and reads the guide line image GI corresponding to the identified assumed steering angle from the memory 123. For example, if, of the assumed steering angles $θ_A[1]$ to $θ_A[n]$, the assumed steering angle closest to the current steering angle θ of the vehicle CR is the assumed steering angle $θ_A[1]$, the sub core 122 reads the guide line image $GI_A[1]$, and, if the assumed steering angle closest to the current steering angle θ of the vehicle CR is the assumed steering angle $θ_A[2]$, the sub core 122 reads the guide line image $GI_A[2]$.

Subsequently to step S26, in step S27, the sub core 122 superposes the guide line image GI read in step S26 on the latest camera image CI captured and acquired by the camera 11R to generate a display image DI, and outputs image data of the display image DI to the display device 20 to have the display image DI displayed on the display device 20. Then, the procedure returns to step S24. Thus, while the shift lever 3 is kept at the reverse position, the processing in steps S26 and S27 is repeated, and, while the guide line image GI superposed on the camera image CI in accordance with the steering angle θ of the vehicle CR at different time points continues being updated, the camera image CI having the guide line image GI superposed on it is displayed on the display device 20 as the display image DI in the form of a moving image.

Although it is here assumed that it is always the sub core 122 that performs the processing in step S26 and S27, instead the main core 121 may, after completing start-up, perform all or part of the processing in step S26 and S27. In any case, at least before the main core 121 completes start-up, the sub core 122 performs the processing in step S26 and S27.

As described above, the vehicle-mounted camera device 10 is configured as follows. A plurality of guide line images GI ($GI_A[1]$ to $GI_A[n]$) generated in the main core 121 with respect to a plurality of steering angles ($θ_A[1]$ to $θ_A[n]$) are held in the memory 123. Then, in the normal mode, in accordance with the steering angle information indicating the current steering angle θ of the vehicle CR, the sub core 122 reads one of the plurality of guide line images GI ($GI_A[1]$ to $GI_A[n]$) from the memory 123 to generate the display image DI using the read guide line image GI.

In this way, even if the main core 121 has not completed start-up in the normal mode, if the sub core 122, which starts up fast, has completed start-up, it is possible to display the display image DI including the guide line image GI using the held guide line image (one of $GI_A[1]$ to $GI_A[n]$). Thus, even if the main core 121 takes two seconds or more to start up, it is possible to conform to the KT (Kids and Transportation Safety) Act in the US (the sub core 122 can start up in a time sufficiently shorter than two seconds). Also, it is possible to utilize an existing vehicle-mounted camera device as it is to produce the vehicle-mounted camera device 10 according to the embodiment; this eliminates extra cost for additional members. Furthermore, it is possible to hold in the memory 123 the guide line images GI ($GI_A[1]$ to $GI_A[n]$) including the guide line GL drawn by the main core 121 in the calibration mode; thus, even in case of a change in the arrangement of the camera 11R or a change in the model of the vehicle CR to which the camera 11R is fitted, it is possible to adjust the guide line image GI (adjust the guide line GL) for the particular vehicle CR mounted with the vehicle-mounted camera device 10. That is, by performing the calibration procedure once again on the vehicle CR, it is possible to generate and hold anew the guide line image GI that is adapted to the situation after the change.

Now, a reference method will be studied. In a reference vehicle-mounted camera device according to the reference method, in the calibration procedure for the device, a calibration computer for drawing and generating guide lines and guide line images with respect to each assumed steering angle is separately prepared, and it is made to draw and generate the guide line images. The guide line images generated by the calibration computer are stored in a non-volatile manner in a memory in the reference vehicle-mounted camera device. Then, in a normal mode of the reference vehicle-mounted camera device, the guide line image corresponding to the actual steering angle of a vehicle is read from the memory, and the display image is generated by superposing the read guide line image on a camera image. With such a reference method, inconveniently, once a camera is fitted to the vehicle, in case of a change in the arrangement of the camera or a change in the model of the vehicle to which the camera is fitted, it is not possible to adjust the guide line image without the help of the calibration computer mentioned above.

Second Practical Example

A second practical example will be described. The second practical example is a partly modified version of the first practical example. For any features not specifically described in connection with the second practical example, unless inconsistent, the corresponding description given above in connection with the first practical example applies to the second practical example as well.

Figure 10:
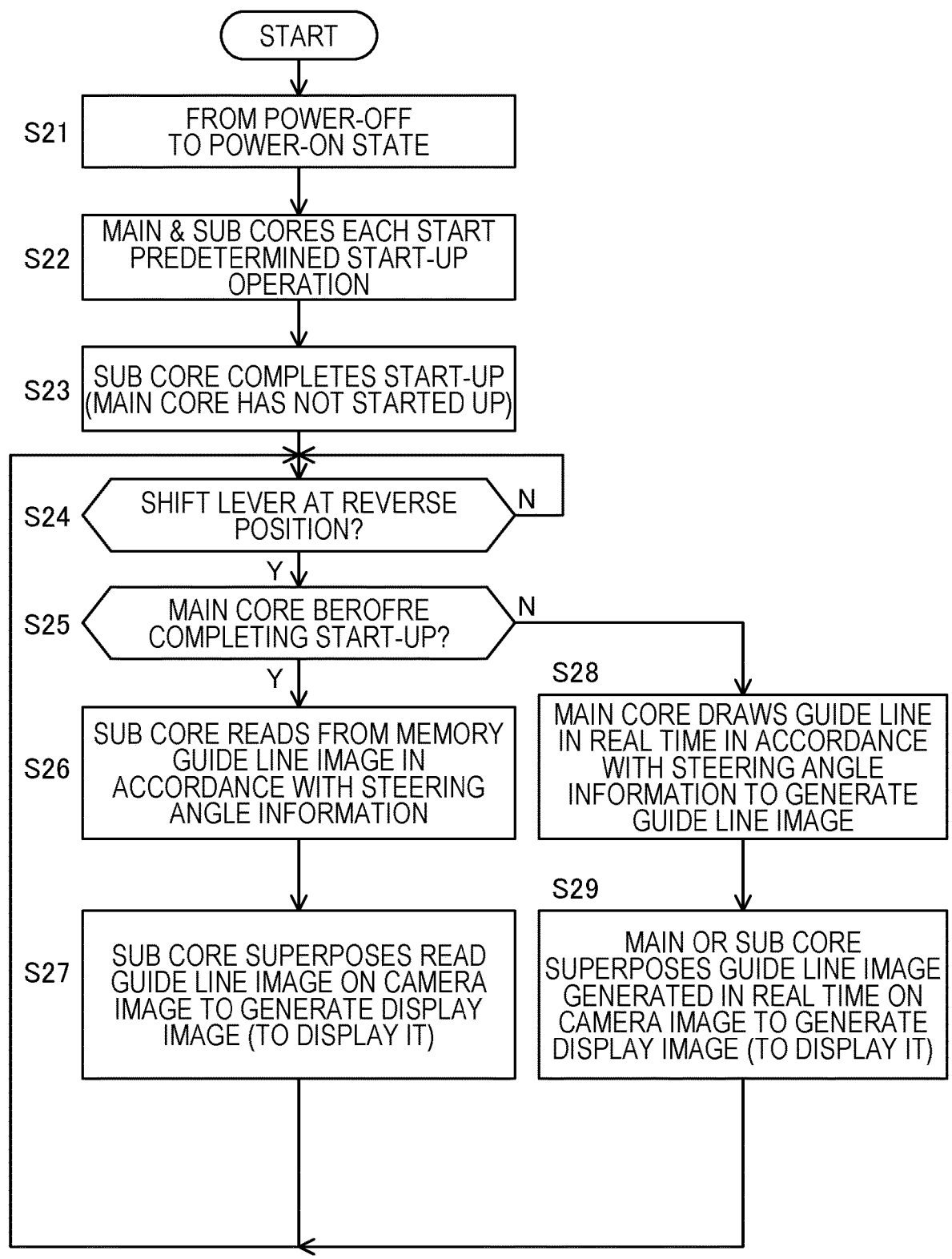
FIG. 10 is a flow chart of the operation of the vehicle-mounted camera device in the normal mode according to a second practical example of the present invention.

FIG. 10 is a flow chart of the operation of a vehicle-mounted camera device 10 in a normal mode according to the second practical example. The operation in the normal mode shown in FIG. 10 is performed after the calibration procedure in FIG. 8. That is, when the operation in FIG. 10 is started, the guide line images $GI_A[1]$ to $GI_A[n]$ have already been stored in the memory 123. The operation shown in FIG. 10 includes processing in step S21 to S29. What is performed in step S21 to S23 is as described in connection with the first practical example.

In step S24 according to the second practical example, the signal processor 12 (for example, the sub core 122) refers to shift information (see FIG. 1) from the shift lever sensor 32 to determine whether or not the shift lever 3 is at the reverse position. When the shift lever 3 is not at the reverse position, the processing in step S24 is repeated. When the shift lever 3 is at the reverse position, the procedure proceeds from step S24 to step S25.

In step S25, the signal processor 12 checks whether the main core 121 is before completing start-up.

In step S25, when the main core 121 is before completing start-up, the procedure proceeds from step S25 to step S26 to perform the processing in step S26 and S27. Through the processing in step S26 and S27, the parking assist function (see FIG. 5) is performed.

What is performed in step S26 to S27 is as described in connection with the first practical example. Thus, in a period in which the shift lever 3 is kept at the reverse position and in addition before the main core 121 completes start-up, the processing in step S26 and S27 is repeated, and, while the guide line image GI to be superposed on the camera image CI in accordance with the steering angle θ of the vehicle CR at different time points continues to be read from the memory 123 and updated, the camera image CI the guide line image GI superposed on it is displayed on the display device 20 as the display image DI in the form of a moving image.

On the other hand, in step S25, if the main core 121 has completed start-up, the procedure proceeds from step S25 to step S28 to perform the processing in step S28 and S29. Through the processing in step S28 and S29, the parking assist function (see FIG. 5) is performed.

In step S28, the main core 121, based on the latest steering angle information acquired from the steering sensor 31, draws a guide line GL in accordance with the current steering angle θ of the vehicle CR by referring to the calibration parameters stored in the memory 123 to generate a guide line image GI including the drawn guide line GL. That is, in step S28, the main core 121, based on the latest steering angle information, draws and generates in real time the guide line GL and the guide line image GI corresponding to the current steering angle θ.

Subsequently to step S28, in step S29, the main core 121 or the sub core 122 superposes the guide line image GI generated in real time in step S28 on the latest camera image CI captured and acquired by the camera 11R to generate a display image DI, and outputs the image data of the display image DI to the display device 20 to have the display image DI displayed on the display device 20. Then, the procedure returns to step S24. Thus, after the main core 121 completes start-up, during the period in which the shift lever 3 is kept at the reverse position, the processing in step S28 and S29 is repeated so that, while the guide line image GI to be superposed on the camera image CI in accordance with the steering angle θ of the vehicle CR at different time points continues to be generated and updated in real time, the camera image CI having the guide line image GI superposed on it is displayed on the display device 20 as the display image DI in the form of a moving image.

As described above, in the vehicle-mounted camera device 10 according to the second practical example, before the main core 121 completes start-up, the sub core 122, in accordance with steering angle information, reads one of a plurality of guide line images GI ($GI_A[1]$ to $GI_A[n]$) from the memory 123 to generate the display image DI using the read guide line image GI. On the other hand, after the main core 121 completes start-up, the main core 121 or the sub core 122 generates the display image DI using the guide line image GI generated in real time by the main core 121 in accordance with steering angle information.

In this way, even if the main core 121 has not completed start-up in the normal mode, if the sub core 122, which starts up fast, has completed start-up, it is possible to display a display image DI including a guide line image GI using the held guide line image GI (one of $GI_A[1]$ to $GI_A[n]$). After the main core 121 completes start-up, a guide line GL drawn by the main core 121 in real time is displayed; thus, it is possible to display an accurate guide line GL in accordance with the actual steering angle θ (a guide line GL that varies smoothly as the steering angle θ changes). That is, before the main core 121 completes start-up, the guide line GL to be displayed is selected from n kinds of guide lines GL; thus it may be difficult to change the guide line GL smoothly as the steering angle θ changes. However, after the main core 121 completes start-up, the guide line GL optimum for the steering angle θ at each moment can be drawn in real time; thus, it is possible to display a guide line GL that varies smoothly as the steering angle θ changes.

Third Practical Example

A third practical example will be described. A state where a vehicle CR is moving (that is, a state where the speed of the vehicle CR is not zero) is referred to as a traveling state, and a state where the vehicle CR is at rest (that is, a state where the speed of the vehicle CR is zero) is referred to as a stationary state. At least when the vehicle CR is in the traveling state, the vehicle-mounted camera device 10 is in a power-on state. When the vehicle CR is in the stationary state, the vehicle-mounted camera device 10 may be in the power-on state or in the power-off state depending on how, for example, the ignition switch 4 is operated.

Figure 11:
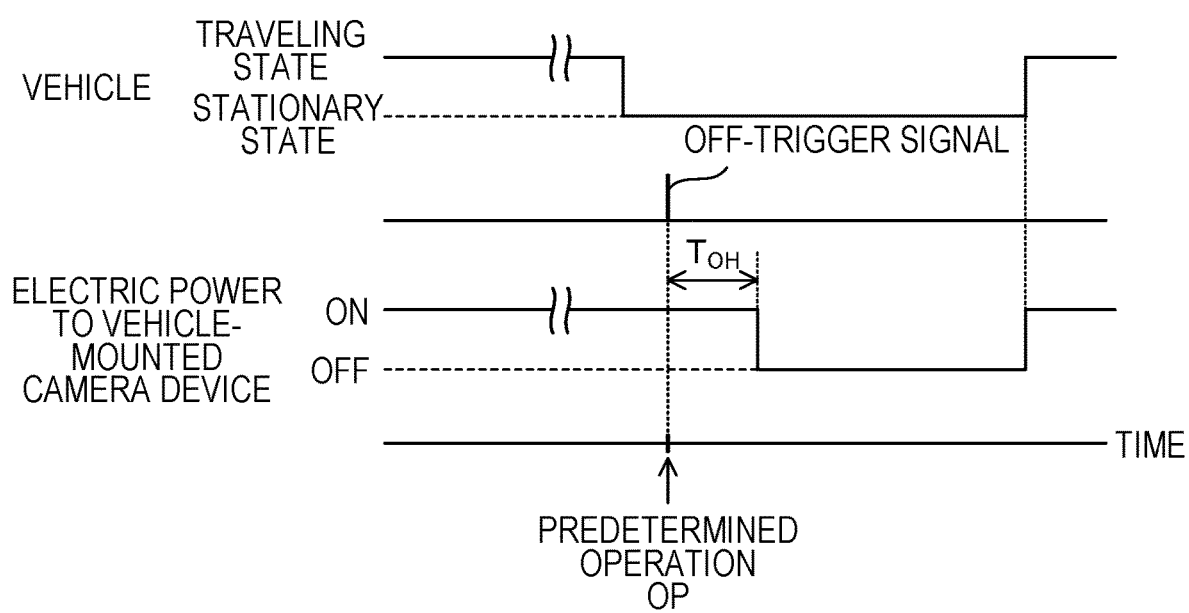
FIG. 11 is a diagram showing the relationship of traveling/stationary states of a vehicle with power-on/-off states of the vehicle-mounted camera device according to a third practical example of the present invention.

With reference to FIG. 11, assume that, when the vehicle CR is in the stationary state, a predetermined operation OP is made by a driver. The predetermined operation OP is an operation that causes the vehicle-mounted camera device 10 to switch from the power-on state to the power-off state. It is assumed that, in response to the predetermined operation OP, a predetermined off-trigger signal is fed to the vehicle-mounted camera device 10 via the in-vehicle network 40, and then, when a predetermined off wait time $T_{OH}$ passes, the vehicle-mounted camera device 10 actually switches from the power-on state to the power-off state.

While, as the predetermined operation OP, an operation on the ignition switch 4 can be assumed, any predetermined operation with respect to any component mounted on the vehicle CR may function as the predetermined operation OP. For example, an operation of actuating a parking brake provided in the vehicle CR may function as the predetermined operation OP. For another example, an operation of setting the shift lever 3 to the neutral position or to a parking position may function as the predetermined operation OP. The off-trigger signal may be a signal that predicts a cut-off of ACC power to the vehicle-mounted camera device 10, or may be an enable signal with respect to the vehicle-mounted camera device 10.

A period corresponding to the off wait time $T_{OH}$ starting at the time point at which the off-trigger signal is fed to the vehicle-mounted camera device 10 is referred to as the off wait period. The signal processor 12 can perform, during the off wait period, necessary processing such as saving necessary data to the memory 123.

In the third practical example, from the perspective of reducing storage capacity necessary in the memory 123, in the calibration procedure in the calibration mode (see FIG. 8), only the processing in step S11 and S12 described above is performed, and the processing in step S13 to S16 is not performed. That is, in the calibration procedure, only the calibration parameters needed for drawing the guide line GL (for generating the guide line image GI) are derived and stored in the memory 123, and no guide line image GI including the guide line GL is stored in the memory 123. In the normal mode after such a calibration procedure, the vehicle-mounted camera device 10 according to the third practical example operates as follows.

Figure 12:
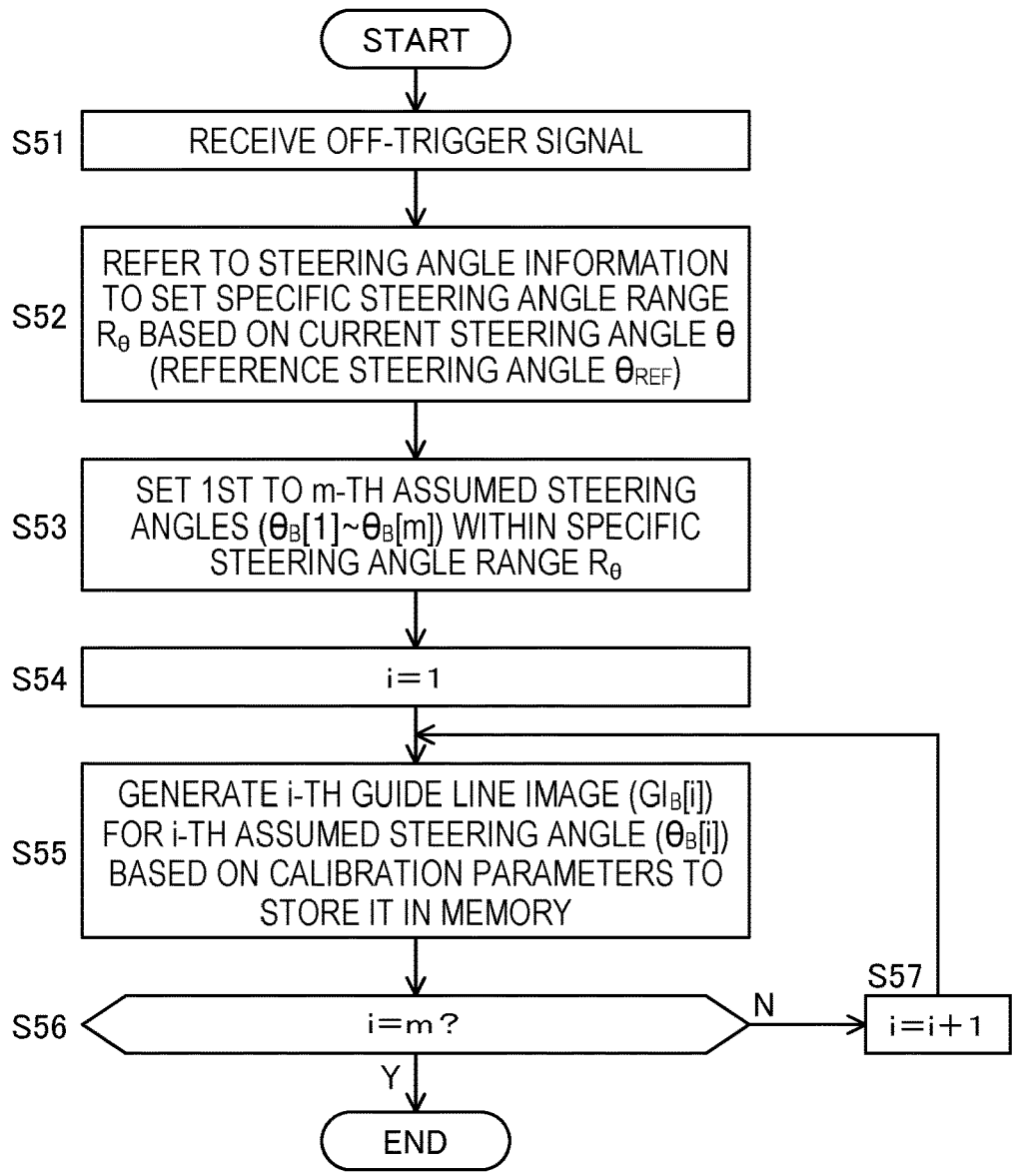
FIG. 12 is a flow chart of the operation of the vehicle-mounted camera device immediately before the vehicle-mounted camera device switches to the power-off state according to the third practical example of the present invention.

FIG. 12 is a flow chart of the operation of the vehicle-mounted camera device 10 starting on reception of the off-trigger signal. When, in step S51, the vehicle-mounted camera device 10 receives the off-trigger signal, the procedure proceeds to step S52, and, in step S52, the main core 121 refers to steering angle information indicating the current steering angle θ of the vehicle CR to set a specific steering angle range Re. The steering angle θ indicated by the steering angle information referred to in step S52 (that is, the steering angle θ in step S52) is referred to as the reference steering angle $θ_{REF}$.

Figure 13:
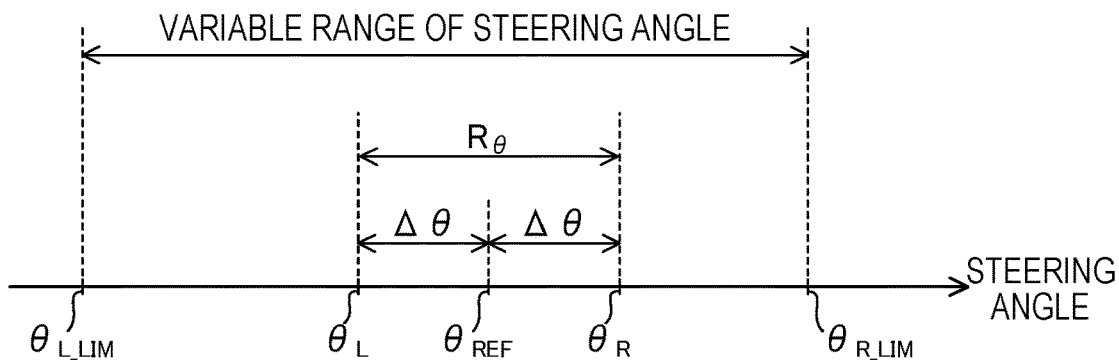
FIG. 13 is a diagram illustrating a specific steering angle range set by a main core according to the third practical example of the present invention.

As shown in FIG. 13, the specific steering angle range $R_θ$ is a range of angles set with reference to the reference steering angle $θ_{REF}$ and is smaller than the variable range of the steering angle θ of the vehicle CR (that is, the range of angles from a predetermined negative angle $θ_{L\_LIM}$ to a predetermined positive angle $θ_{R\_LIM}$). More specifically, the specific steering angle range Re is a range of angles from the angle θL to the angle $θ_R$, having a width corresponding to the angle (2×Δθ) about the reference steering angle $θ_{REF}$. Here, the lower limit of the specific steering angle range $R_θ$ is limited to the angle θL_LIM, and the upper limit of the specific steering angle range $R_θ$ is limited to the angle $θ_{R\_LIM}$. That is, the angle θL is, of the angles ($θ_{REF}$−Δθ) and $θ_{L\_LIM}$, the larger, and the angle $θ_R$ is, of the angles ($θ_{REF}$+ 40) and $θ_{R\_LIM}$, the smaller. In the example in FIG. 13, "$θ_{L\_LIM}<θ_L<θ_{REF}<θ_R<θ_{R\_LIM}$", but "$θ_{L\_LIM}=θ_L$" or "$θ_R=θ_{R\_LIM}$" may be fulfilled. While the angle Δθ can be any angle, it can be, for example, "Δθ=10°". The magnitude of an angle here is it's magnitude with consideration given to its polarity, and a negative angle is considered to be smaller than any positive angle regardless of its absolute value. For example, −30° is smaller than any of −20°, −10°, 0°, 10°, 20°, and 30°, and −20° is smaller than any of −10°, 0°, 10°, 20°, and 30°.

With reference again to FIG. 12, after step S52, the procedure proceeds to step S53. In step S53, the main core 121 sets a plurality of assumed steering angles in the specific steering angle range Re. As described above, the assumed steering angle indicates not the value indicating the actual steering angle θ of the vehicle CR but an assumed value of the steering angle θ the vehicle CR can take. Of the plurality of assumed steering angles set in step S53, the i-th assumed steering angle is referred to as the assumed steering angle $θ_B[i]$. It is assumed that, in step S53, the first to m-th assumed steering angles (that is, $θ_B[1]$ to $θ_B[m]$) are set. Here, m is any integer of two or more.

The assumed steering angles $θ_B[1]$ to $θ_B[m]$ each take a different value within the specific steering angle range Re. The assumed steering angles $θ_B[1]$ to $θ_B[m]$ may be set by dividing the specific steering angle range Re simply at equal intervals, such that every two adjacent assumed steering angles have an equal interval. That is, the assumed steering angles $θ_B[1]$ to $θ_B[m]$ may be set by discretizing the specific steering angle range Re at even angular intervals. In this case, the resolution of allocation of the assumed steering angles $θ_B[1]$ to $θ_B[m]$ is even across the entire specific steering angle range $R_θ$. The assumed steering angles $θ_B[1]$ to $θ_B[m]$ may be set such that the resolution of their allocation is higher around where the steering angle θ is equal to the reference steering angle $θ_{REF}$ than elsewhere. That is, for example, in the range of angles equal to or larger than $(θ_{REF}-4°)$ but equal to or smaller than $(θ_{REF}+)$ 4°, a total of nine assumed steering angles are set at intervals of 1°, and in the range of angles outside that range, the assumed steering angles may be set at intervals of 2°.

After step S53, the procedure proceeds to step S54. In step S54, the signal processor 12 substitutes "1" in a variable i, and the procedure proceeds to step S55. Here, i is a variable that takes any natural number.

In step S55, the main core 121, based on the calibration parameters, draws a guide line GL corresponding to the i-th assumed steering angle to generate the i-th guide line image GI including the guide line GL, and stores the i-th guide line image GI in the memory 123. The i-th guide line image GI generated and stored in step S55 is referred to as the guide line image $GI_B[i]$. The guide line image $GI_B[i]$ is, on the assumption that the actual steering angle θ of the vehicle CR is equal to the assumed steering angle $θ_B[i]$, a two-dimensional image including the guide line GL.

After step S55, the procedure proceeds to step S56. In step S56, the signal processor 12 checks whether or not the variable i is equal to a predetermined integer m. In step S56, unless "i=m", the procedure proceeds from step S56 to S57, where the variable i is incremented by one, and the procedure returns to step S55 to perform the processing in step S55 again. In step S56, if "i=m", the operation in FIG. 12 ends. When "i=m" and the operation in FIG. 12 ends, the guide line images $GI_B[1]$ to $GI_B[m]$ have been stored in the memory 123.

If, for example, "m=5", in the calibration procedure, five guide line images GI (five kinds of guide line images GI) as shown in FIGS. 7A to 7E are stored as the guide line images $GI_B[1]$ to $GI_B[5]$ in the memory 123, and, if "$θ_{REF}=10°$", the guide line images $GI_B[1]$ to $GI_B[5]$ include, for example, guide lines GL with "$θ=θ_B[1]=0°$", "$θ=θ_B[2]=5°$", "$θ=θ_B[3]=10°$", "$θ=θ_B[4]=15°$" and "$θ=θ_B[5]=20°$" respectively.

The processing in step S51 to S57 is performed during the off wait period having a length corresponding to the off wait time $T_{OH}$, and, after the operation in FIG. 12 ends, the vehicle-mounted camera device 10 switches from the power-on state to the power-off state. Then, when the vehicle-mounted camera device 10 returns to the power-on state, the operation (see FIG. 10) in the normal mode described in connection with the second practical example is performed. Thus, before the main core 121 completes start-up (Y in step S25), one of the guide line images GI (one of the guide line images $GI_B[1]$ to $GI_B[m]$) generated in step S55 in FIG. 12 and stored in the memory 123 is read from the memory 123 in accordance with steering angle information and, with the read guide line image GI superposed on the camera image CI, the display image DI is generated (step S26 and S27). After the main core 121 completes start-up (N in step S25), the processing in step S28 and S29 in FIG. 10 may be performed. When the description of the second practical example is applied to the third practical example, the symbols in the second practical example "$θ_A$", "$GI_A$", and "n" are to be read as "$θ_B$", "$GI_B$", and "m" respectively.

Between when the vehicle CR is at rest and when the vehicle CR thereafter starts traveling, there should be no change in the steering angle θ. With this taken into consideration, in the third practical example, as described above, when, with the vehicle CR in the stationary state, the vehicle-mounted camera device 10 switches from the power-on state to the power-off state, the main core 121, before switching to the power-off state, performs holding processing for holding the guide line images $GI_B[1]$ to $GI_B[m]$ in the memory 123. The holding processing here includes the processing in step S51 to S57 in FIG. 12. The main core 121, in the holding processing, sets the specific steering angle range Re smaller than the variable range of the steering angle θ of the vehicle CR based on steering angle information (the reference steering angle $θ_{REF}$) with the vehicle CR in the stationary state, and generates two or more guide line images ($GI_B[1]$ to $GI_B[m]$) with respect to two or more steering angles ($θ_B[1]$ to $θ_B[m]$) within the set specific steering angle range Re. Then, the main core 121 holds the two or more guide line images in the memory 123.

With the method described above, it is possible to hold in the memory 123 the guide line image GI that may be needed immediately after the start-up of the vehicle-mounted camera device 10 with as small a storage capacity as possible; this helps reduce the storage capacity necessary in the memory 123.

The guide line images $GI_B[1]$ to $GI_B[m]$ are generated every time the vehicle-mounted camera device 10 switches from the power-on state to the power-off state. Every time the switching takes place, the guide line images $GI_B[1]$ to $GI_B[m]$ stored in the memory 123 are updated. That is, if, in a state where the guide line images $GI_B[1]$ to $GI_B[m]$ are stored in the memory 123, the operation in FIG. 12 is performed and the guide line images $GI_B[1]$ to $GI_B[m]$ are generated anew, the new guide line images $GI_B[1]$ to $GI_B[m]$ are stored by overwriting the guide line images $GI_B[1]$ to $GI_B[m]$ that have been stored in the memory 123.

Fourth Practical Example

A fourth practical example will be described. The fourth practical example deals with a technique that, in combination with the second or third practical example, helps reduce the storage capacity necessary in the memory 123.

After the main core 121 completes start-up, the main core 121 can draw the guide line GL in real time to superpose the guide line image GI on the camera image CI. Here, the amount of information of each of the guide line images GI held in the memory 123 can be reduced compared to the amount of information of the guide line image GI that can be generated by the main core 121 after the main core 121 completes start-up. In this way, it is possible to reduce the storage capacity necessary in the memory 123. By reducing the amount of information of the guide line GL, the amount of information of the guide line image GI is reduced. Accordingly, by reducing the amount of information of the guide line GL of the guide line image GI held in the memory 123 compared to the amount of information of the guide line GL that can be drawn by the main core 121, it is possible to reduce the amount of information of each of the guide line images GI held in the memory 123 compared to the amount of information of the guide line image GI that can be generated by the main core 121. An additional description will follow.

A first information amount adjustment method will be described. For example, consider a case where, as shown in FIG. 6, the main core 121 can draw a guide line GL including two main lines GL1 and three auxiliary lines GL2. In the first information amount adjustment method, in each of guide line images $GI_A[1]$ to $GI_A[n]$ or $GI_B[1]$ to $GI_B[m]$ stored in the memory 123, the guide line GL is constructed to include the two main lines GL1 but not the three auxiliary lines GL2, or, the guide line GL is constructed to include the two main lines GL1 and two or less auxiliary lines GL2. In this way, the amount of information of the guide line GL in each of the guide line images GI held in the memory 123 is smaller by an amount corresponding to one or more auxiliary lines GL2 compared to the amount of information of the guide line GL that can be drawn by the main core 121. In this case, in step S28 in FIG. 10, a guide line GL including two main lines GL1 and three auxiliary lines GL2 can be drawn, and a guide line image GI including the guide line GL having two main lines GL1 and three auxiliary lines GL2 can be generated.

A second information amount adjustment method will be described. For example, consider a case where, as shown in FIG. 6, the main core 121 can draw a guide line GL including two main lines GL1 and three auxiliary lines GL2 using, although not clear from FIG. 6, different colors for the main lines GL1 and the auxiliary lines GL2. In the second information amount adjustment method, in each of the guide line images $GI_A[1]$ to $GI_A[n]$ or $GI_B[1]$ to $GI_B[m]$ stored in the memory 123, the guide line GL is constructed to include the main lines GL1 and the auxiliary lines GL2, but these are drawn in the same color. In this way, the amount of information of the guide line GL in each of the guide line images GI held in the memory 123 is smaller by an amount corresponding to the extra line color compared to the amount of information of the guide line GL that can be drawn by the main core 121. In this case, in step S28 in FIG. 10, a guide line GL including two main lines GL1 in a first color and three auxiliary lines GL2 in a second color can be drawn, and a guide line image GI including the guide line GL can be generated. Here, the first and second colors are different.

The first and second information amount adjustment methods may be implemented in combination. Or, any other method can be used to realize the magnitude relationship of the amount of information as described above.

Also, the following can be said. In step S28 in FIG. 10, the main core 121 can draw a guide line GL with respect to each of P steering angles θ (in other words, P kinds of steering angles θ) in the variable range of the steering angle θ; thus, the main core 121 can draw and generate P kinds of guide lines GL and P kinds of guide line images GI corresponding to the P steering angles θ. This does not mean that P kinds of guide line images GI can be generated simultaneously, but means that one of P kinds of guide line images GI can be generated selectively in accordance with the current steering angle θ. P is any integer of two or more. The integer P may have a very large value corresponding to the resolution of the steering angle θ indicated by steering angle information. For example, when the variable range of the steering angle θ is between (−40°) and (+40°), if the resolution of the steering angle θ indicated by steering angle information is 0.1°, "(40+40)/0.1+1=801"; thus it can be that "P=801". On the other hand, the integer n referred to in FIG. 8 and the integer m referred to in FIG. 12 are smaller than the integer P.

That is, for example, while P kinds of steering angles θ are P angles that result from discretization at predetermined first angular intervals (for example, 0.1°), n kinds of assumed steering angles in FIG. 8 ($θ_A[1]$ to $θ_A[n]$) are n angles that result from discretization at predetermined second angular intervals (for example, 5°) larger than the first angular intervals; or, m kinds of assumed steering angles in FIG. 12 ($θ_B[1]$ to $θ_B[m]$) are m angles that result from discretization at predetermined second angular intervals (for example, 5°) larger than the first angular intervals. In this way, the number of kinds (n or m) of guide line images GI held in the memory 123 is smaller than the number of kinds P of guide line images GI that can be generated by the main core 121 after the main core 121 completes start-up. Thus, it is possible to suppress an increase in the storage capacity necessary in the memory 123.

Fifth Practical Example

A fifth practical example will be described. The method described in connection with the first or second practical example and the method described in connection with the third practical example can be implemented in combination. The fifth practical example deals with a method according to such combination.

In the vehicle-mounted camera device 10 according to the fifth practical example, as described in connection with the first practical example, the calibration procedure in FIG. 8 is performed in the calibration mode and, through that calibration procedure, the guide line images $GI_A[1]$ to $GI_A[n]$ are stored in the memory 123. Then, in the normal mode, following the method described in connection with the third practical example, the operation in FIG. 12 is performed every time the vehicle-mounted camera device 10 switches from the power-on state to the power-off state, and, through that operation, the guide line images $GI_B[1]$ to $GI_B[m]$ are stored in the memory 123.

Figure 14:
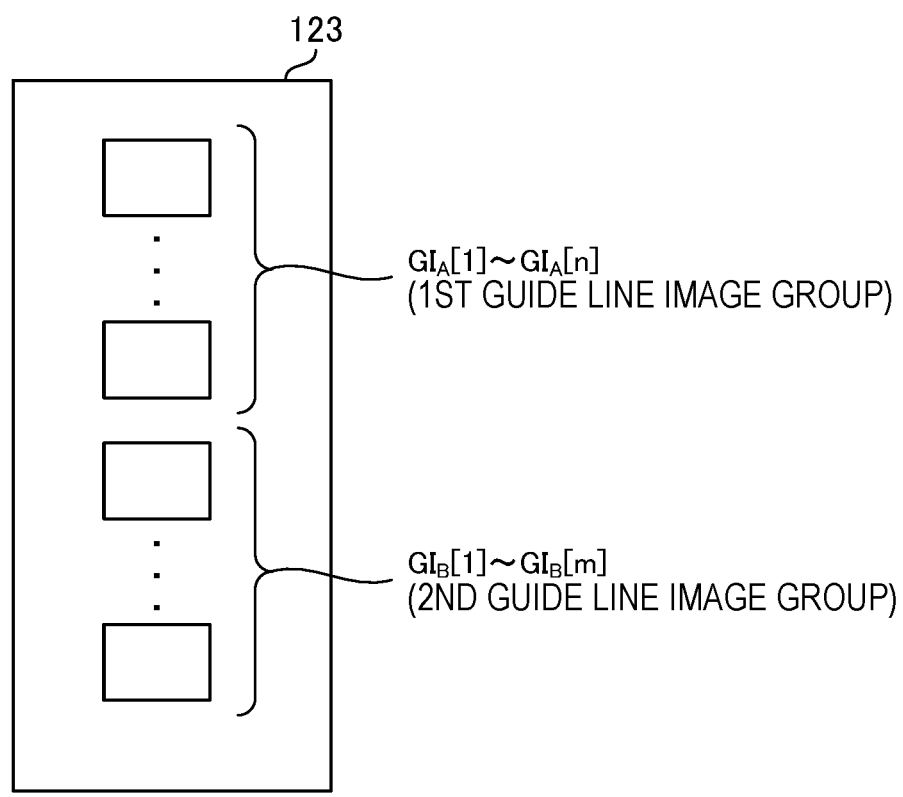
FIG. 14 is a schematic diagram schematically showing what is stored in a memory according to a fifth practical example of the present invention.

FIG. 14 conceptually shows how the guide line images $GI_A[1]$ to $GI_A[n]$ resulting from the operation in FIG. 8 and the guide line images $GI_B[1]$ to $GI_B[m]$ resulting from the operation FIG. 12 are stored in the memory 123. As described in connection with the third practical example, the guide line images $GI_B[1]$ to $GI_B[m]$ are generated every time the vehicle-mounted camera device 10 switches from the power-on state to the power-off state, and every time the switching takes place, the guide line images $GI_B[1]$ to $GI_B[m]$ stored in the memory 123 are updated. That is, if, in a state where the guide line images $GI_B[1]$ to $GI_B[m]$ have been stored in the memory 123, the operation in FIG. 12 is performed and the guide line images $GI_B[1]$ to $GI_B[m]$ are generated anew, the new guide line images $GI_B[1]$ to $GI_B[m]$ are stored by overwriting the guide line images $GI_B[1]$ to $GI_B[m]$ that have been stored in the memory 123. Once the guide line images $GI_A[1]$ to $GI_A[n]$ are stored in the memory 123 in the calibration procedure, unless the calibration procedure is performed again, they continue to be stored in the memory 123.

Figure 15:
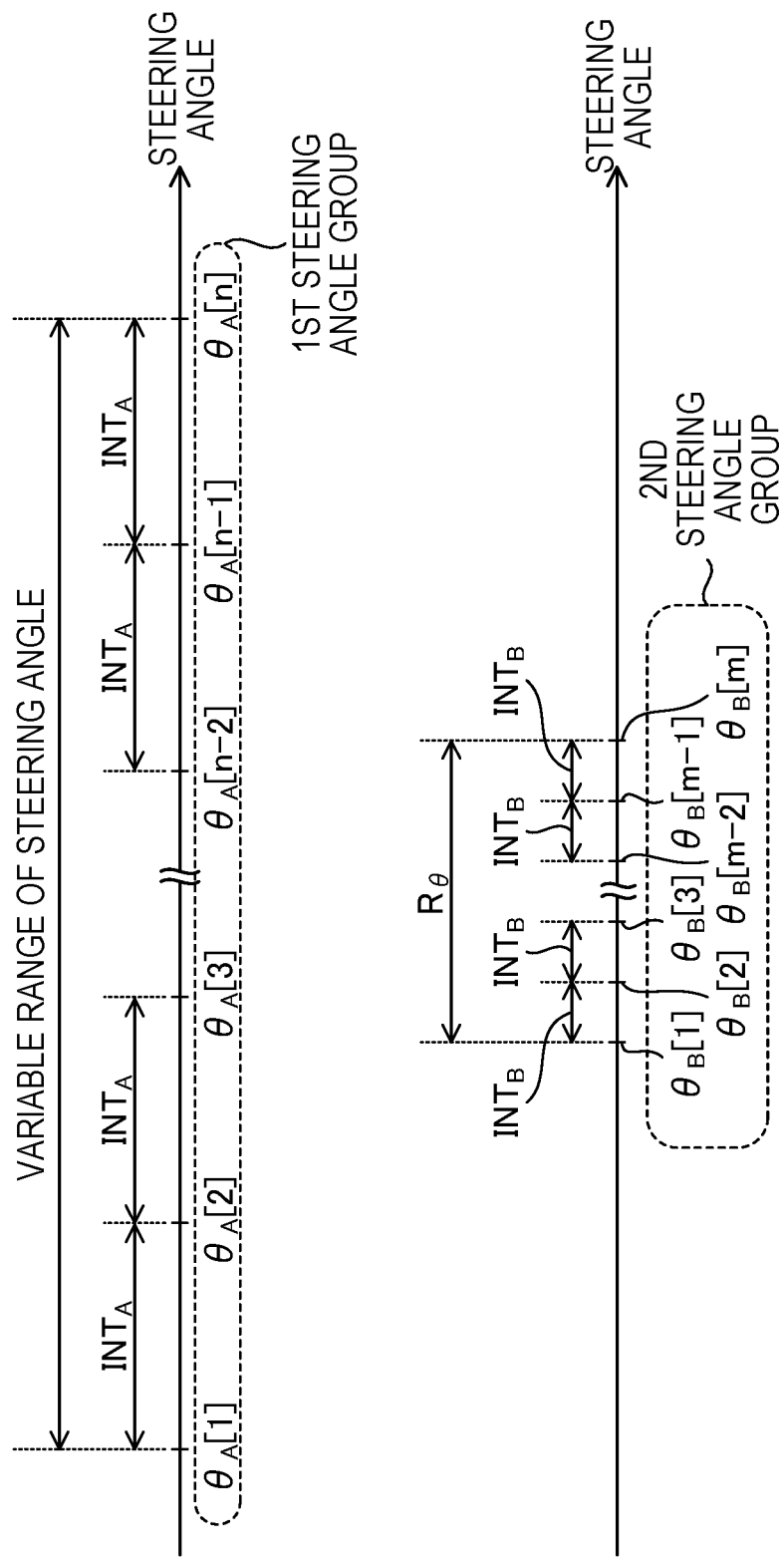
FIG. 15 is a diagram showing a plurality of steering angles (a plurality of assumed steering angles) corresponding to a plurality of guide line images stored in the memory according to the fifth practical example of the present invention.

FIG. 15 shows an example of the relationship between the assumed steering angles $\theta_A[1]$ to $\theta_A[n]$ corresponding to the guide line images $GI_A[1]$ to $GI_A[n]$ and the assumed steering angles $\theta_B[1]$ to $\theta_B[m]$ corresponding to the guide line images $GI_B[1]$ to $GI_B[m]$. Here, it is assumed that, for any integer i, "$\theta_A[i]<\theta_A[i+1]$" and "$\theta_B[i]<\theta_B[i+1]$" hold. It can be understood that the assumed steering angles $\theta_A[1]$ to $\theta_A[n]$ constitute a first steering angle group and that the assumed steering angles $\theta_B[1]$ to $\theta_B[m]$ constitute a second steering angle group. Then, it can be understood that the guide line images $GI_A[1]$ to $GI_A[n]$ constitute a first guide line image group with respect to the first steering angle group and that the guide line images $GI_B[1]$ to $GI_B[m]$ constitute a second guide line image group with respect to the second steering angle group (see FIG. 14).

The first steering angle group includes a plurality of first steering angles that result from discretization at predetermined angular intervals $INT_A$, and the assumed steering angles $\theta_A[1]$ to $\theta_A[n]$ correspond to the plurality of first steering angles. That is, for any integer i, "$\theta_A[i]+INT_A=\theta_A[i+1]$" holds. $INT_A$ is a predetermined positive angle value (for example, 10°). It can be understood that the assumed steering angles $\theta_A[1]$ to $\theta_A[n]$ are set at angular intervals of $INT_A$. In FIG. 15, the lower limit ($\theta_{L\_LIM}$; see FIG. 13) of the variable range of the steering angle $\theta$ is equal to the assumed steering angle $\theta_A[1]$, and the upper limit ($O_{R\_LIM}$; see FIG. 13) of the variable range of the steering angle $\theta$ is equal to the assumed steering angle $\theta_A[n]$ (though such agreement is not essential).

The second steering angle group includes a plurality of second steering angles that result from discretization at predetermined angular intervals $INT_B$, and the assumed steering angles $\theta_B[1]$ to $\theta_B[m]$ correspond to the plurality of second steering angles. That is, for any integer i, "$\theta_B[i]+INT_B=\theta_B[i+1]$" holds. $INT_B$ is a predetermined positive angle value (for example, 2°). The assumed steering angles $\theta_B[1]$ to $\theta_B[m]$ are set at intervals of $INT_B$.

Here, the angular interval $INT_B$ is smaller than the angular interval $INT_A$. That is, for example, if the angular interval $INT_A$ is 10°, the angular interval $INT_B$ is set at 2°. That is, in the calibration procedure in FIG. 8, from the perspective of reducing the storage capacity necessary in the memory 123, the guide line images $GI_A[1]$ to $GI_A[n]$ are generated and stored at relatively rough angular intervals (at the angular intervals $INT_A$), and in the subsequent normal mode, within an angle range around the steering angle $\theta$ of the vehicle CR at rest, the guide line images $GI_B[1]$ to $GI_B[m]$ are generated at relatively fine angular intervals (at the angular intervals $INT_B$) to be stored.

When, in the normal mode, the vehicle-mounted camera device 10 switches from the power-off state to the power-on state, the operation in the first practical example (that is, the operation in FIG. 9) may be performed, or, the operation in the second practical example (that is, the operation in FIG. 10) may be performed.

In step S26 (see FIG. 9 or 10) according to the fifth practical example, the sub core 122, based on the latest steering angle information acquired from the steering sensor 31, reads from the memory 123 the guide line image GI (one of the guide line images $GI_A[1]$ to $GI_A[n]$ and $GI_B[1]$ to $GI_B[m]$) in accordance with the current steering angle $\theta$ of the vehicle CR. That is, the sub core 122 identifies, of the assumed steering angles $\theta_A[1]$ to $\theta_A[n]$ and $\theta_B[1]$ to $\theta_B[m]$, the assumed steering angle closest to the current steering angle $\theta$ of the vehicle CR, and reads from the memory 123 the guide line image GI corresponding to the identified assumed steering angle. For example, if, of the assumed steering angles $\theta_A[1]$ to $\theta_A[n]$ and $\theta_B[1]$ to $\theta_B[m]$, the assumed steering angle closest to the current steering angle $\theta$ of the vehicle CR is the assumed steering angle $\theta_A[1]$, the sub core 122 reads the guide line image $GI_A[1]$, and, if the assumed steering angle closest to the current steering angle $\theta$ of the vehicle CR is the assumed steering angle $\theta_B[1]$, the sub core 122 reads the guide line image $GI_B[1]$. After step S26, the procedure proceeds to step S27.

In step S27 (see FIG. 9 or 10) according to the fifth practical example, the sub core 122 superposes the guide line image GI read in step S26 on the latest camera image CI captured and acquired by the camera 11R to generate a display image DI, and outputs the image data of the display image DI to the display device 20 to have the display image DI displayed on the display device 20. Then, the procedure returns to step S24. If the operation in FIG. 9 is applied as the operation in the normal mode according to the fifth practical example, the main core 121 may, after completing start-up, perform all or part of the processing in step S26 and S27. In any case, at least before the main core 121 completes start-up, the sub core 122 performs the processing in step S26 and S27.

In this way, when, with the vehicle CR in the stationary state, the vehicle-mounted camera device 10 switches from the power-on state to the power-off state, the main core 121, before switching to the power-off state, performs holding processing for holding in the memory 123 the second guide line image group (the guide line images $GI_B[1]$ to $GI_B[m]$). The holding processing here includes the processing in steps S51 to S57 in FIG. 12. The first guide line image group (the guide line images $GI_A[1]$ to $GI_A[n]$) is stored in advance in the memory 123 before the holding processing. The main core 121, in the holding processing, sets the specific steering angle range Re smaller than the variable range of the steering angle $\theta$ of the vehicle CR based on steering angle information (the reference steering angle $\theta_{REF}$) with the vehicle CR in the stationary state, and generates two or more guide line images ($GI_B[1]$ to $GI_B[m]$) with respect to two or more steering angles ($\theta_B[1]$ to $\theta_B[m]$) within the set specific steering angle range Re. The main core 121 then holds in the memory 123 the two or more guide line images as the second guide line image group. In this case, the angular interval $INT_A$ of the first steering angle group corresponding to the first guide line image group is set relatively large, and the angular interval $INT_B$ of the second steering angle group corresponding to the second guide line image group is set relatively small.

With the method described above, it is possible to display, immediately after the start-up of the vehicle-mounted camera device 10, the guide lines GL that change smoothly around the current steering angle $\theta$ while minimizing the storage capacity necessary in the memory 123.

Here, the amount of information of each of the guide line images GI in the second guide line image group may be larger than the amount of information of each of the guide line images GI in the first guide line image group. That is, the amount of information of each of the guide line images $GI_B[1]$ to $GI_B[m]$ may be larger than the amount of information of each of the guide line images $GI_A[1]$ to $GI_A[n]$. In this way, it is possible to display, immediately after the start-up of the vehicle-mounted camera device 10, the guide line image GI that provides a larger amount of information around the current steering angle θ while minimizing the storage capacity necessary in the memory 123.

An increase in the amount of information of the guide line GL leads to an increase in the amount of information of the guide line image GI. Thus, by reducing the amount of information of the guide line GL in each of the guide line images GI ($GI_A[i]$) in the first guide line image group compared to the amount of information of the guide line GL in each of the guide line images GI ($GI_B[i]$) in the second guide line image group, it is possible to make the amount of information of each of the guide line images GI in the second guide line image group larger than the amount of information of each of the guide line images GI in the first guide line image group. This can be achieved by use of the first or second information amount adjustment method described above.

How to use the first information amount adjustment method will be described. For example, consider a case where, as shown in FIG. 6, the main core 121 can draw the guide line GL including two main lines GL1 and three auxiliary lines GL2. With the first information amount adjustment method, in each of the guide line images $GI_A[1]$ to $GI_A[n]$ stored in the memory 123, the guide line GL is constructed to include the two main lines GL1 but not the three auxiliary lines GL2, or, the guide line GL is constructed to include the two main lines GL1 and two or less auxiliary lines GL2. On the other hand, in each of the guide line images $GI_B[1]$ to $GI_B[m]$ stored in the memory 123, the guide line GL is constructed to include the two main lines GL1 and the three auxiliary lines GL2. In this way, in the guide line images $GI_B[1]$ to $GI_B[m]$, the amount of information of the guide line GL is larger by an amount corresponding to one or more auxiliary lines GL2 compared to in the guide line images $GI_A[1]$ to $GI_A[n]$. In this case, in step S28 in FIG. 10, a guide line GL including two main lines GL1 and three auxiliary lines GL2 can be drawn, and a guide line image GI including the guide line GL having two main lines GL1 and three auxiliary lines GL2 can be generated.

How to use the second information amount adjustment method will be described. For example, consider a case where, as shown in FIG. 6, the main core 121 can draw a guide line GL including two main lines GL1 and three auxiliary lines GL2 using, although not clear from FIG. 6, different colors for the main lines GL1 and the auxiliary lines GL2. With the second information amount adjustment method, in each of the guide line images $GI_A[1]$ to $GI_A[n]$ stored in the memory 123, the guide line GL is constructed to include the two main lines GL1 and the three auxiliary lines GL2 in the same color. On the other hand, in each of the guide line images $GI_B[1]$ to $GI_B[m]$ stored in the memory 123, the guide line GL is constructed to include the two main lines GL1 in a first color and the three auxiliary lines GL2 in a second color. The first and second colors are different. In this way, in the guide line images $GI_B[1]$ to $GI_B[m]$, the amount of information of the guide line GL is larger by an amount corresponding to the extra line color compared to in the guide line images $GI_A[1]$ to $GI_A[n]$. In this case, in step S28 in FIG. 10, a guide line GL including two main lines GL1 in a first color and three auxiliary lines GL2 in a second color can be drawn, and a guide line image GI including that guide line GL can be generated.

The first and second information amount adjustment methods may be implemented in combination, or, any other method can be used to realize the magnitude relationship of the amount of information as described above.

Sixth Practical Example

A sixth practical example will be described. In the vehicle-mounted camera device 10, the guide line image GI is superposed on a reference image based on the capturing results from the camera mounted on the vehicle CR, and the reference image having the guide line image GI superposed on it is output to (displayed on) the display device 20 as a display image DI. The practical examples described above deal with specific examples where, with focus on the camera 11R that is a rear camera, the camera image CI that is a captured image from the camera 11R is used as a reference image and the guide line image GI is superposed on the camera image CI. However, the reference image on which the guide line image GI is to be superposed is not limited to a captured image from the camera 11R (rear camera).

For example, in a case where a plurality of cameras including the camera 11R (rear camera) are provided in the camera section 11 in the vehicle-mounted camera device 10, a merged image of the captured images from a plurality of cameras can be used as a reference image, and the guide line image GI can be superposed on the merged image of the captured images from the plurality of cameras. More specifically, for example, in a case where, in addition to the camera 11R (rear camera), the front camera, the right camera, and the left camera described above are provided in the camera section 11, the captured images from those cameras can be merged in the signal processor 12 (for example, the main core 121 or the sub core 122) to generate an overhead image as if looking down on the vehicle CR. This overhead image can be used as the reference image mentioned above. In that case, the guide line image GI is superposed on the overhead image, and the resulting overhead image is output to (displayed on) the display device 20 as the display image DI.

Embodiments of the present invention can be implemented with various modifications made within the sense of their technical ingenuity defined in the appended claims. It should be understood that the embodiments described above are merely examples of how the present invention can be implemented, and thus the senses of the terms used to describe the present invention and its constituent elements are not limited in any way to those in which they are used in the above description of embodiments. The specific values mentioned in the above description are meant merely as examples, and they may be modified to different values.

LIST OF REFERENCE SIGNS

10 vehicle-mounted camera device
11 camera section
11R camera (rear camera)
12 signal processor
20 display device
30 vehicle-mounted sensor section
40 in-vehicle network
121 main core
122 sub core
123 memory
CI camera image
GI guide line image
DI display image
GL guide line

The invention claimed is:

1. A vehicle-mounted camera device mounted on a vehicle, the vehicle-mounted camera device comprising:
a first processor configured to generate a guide line image including a guide line in accordance with a steering angle of the vehicle;
a second processor configured to superpose the guide line image on a reference image based on a capturing result from a camera mounted on the vehicle, to output the reference image superposed with the guide line image to a display device as a display image; and a memory that holds a plurality of guide line images generated by the first processor with respect to a plurality of steering angles, wherein when the first processor has not completed start-up, the second processor outputs the display image generated using one of the plurality of guide line images read from the memory by the second processor in accordance with steering angle information indicating a current steering angle of the vehicle, and when the first processor has completed the start-up, the second processor outputs the display image generated using the guide line image generated in real time by the first processor in accordance with the steering angle information.

2. The vehicle-mounted camera device according to claim 1, wherein when the vehicle-mounted camera device switches from a power-off state to a power-on state, of the first and second processors, the second processor completes start-up first.

3. The vehicle-mounted camera device according to claim 2, wherein when, with the vehicle in a stationary state, the vehicle-mounted camera device switches from the power-on state to the power-off state, the first processor performs holding processing before switching to the power-off state, and the first processor, in the holding processing:

sets a range smaller than a variable range of the steering angle of the vehicle based on the steering angle information with the vehicle in the stationary state, generates two or more guide line images with respect to the two or more steering angles within the set range, and holds in the memory the two or more guide line images as the plurality of guide line images.

4. The vehicle-mounted camera device according to claim 2, wherein an amount of information of each of the guide line images held in the memory is smaller than an amount of information of the guide line image that can be generated by the first processor after the first processor completes the start-up.

5. The vehicle-mounted camera device according to claim 2, wherein a number of kinds of guide line images held in the memory is smaller than a number of kinds of guide line images that can be generated by the first processor after the first processor completes the start-up.

6. The vehicle-mounted camera device according to claim 1, wherein the plurality of guide line images held in the memory include:

guide line images in a first guide line image group with respect to a first steering angle group, and guide line images in a second guide line image group with respect to a second steering angle group, the first steering angle group includes a plurality of first steering angles, the second steering angle group includes a plurality of second steering angles that result from discretization at predetermined angular intervals smaller than angular intervals of the plurality of first steering angles, when, with the vehicle in a stationary state, the vehicle-mounted camera device switches from a power-on state to a power-off state, the first processor performs holding processing before switching to the power-off state, and the first guide line image group is held in the memory in advance before the holding processing, and the first processor, in the holding processing:

sets a range smaller than a variable range of the steering angle of the vehicle based on the steering angle information with the vehicle in the stationary state, sets in the set range two or more steering angles at the predetermined angular intervals as the second steering angle group, generates two or more guide line images with respect to the two or more steering angles, and holds in the memory the two or more guide line images as the second guide line image group.

7. The vehicle-mounted camera device according to claim 6, wherein an amount of information of each of the guide line images in the second guide line image group is larger than an amount of information of each of the guide line images in the first guide line image group.

8. A method of generating a display image used in a vehicle-mounted camera device which is mounted on a vehicle and which includes a first processor, a second processor, and a memory, the method comprising:

a first step in which the first processor generates a guide line image including a guide line in accordance with a steering angle of the vehicle;

a second step in which the second processor superposes the guide line image on a reference image based on a capturing result from a camera mounted on the vehicle, to output the reference image superposed with the guide line image to a display device as the display image; and a third step in which the memory holds a plurality of guide line images generated in the first step with respect to a plurality of steering angles, wherein in the second step, when the first processor has not completed start-up, the display image is output that is generated using one of the plurality of guide line images read from the memory by the second processor in accordance with steering angle information indicating a current steering angle of the vehicle, and when the first processor has completed the start-up, the display image is output that is generated using the guide line image generated in real time by the first processor in accordance with the steering angle information.

9. A vehicle-mounted camera device mounted on a vehicle, the vehicle-mounted camera device comprising:

a first processor core configured to generate a guide line image including a guide line in accordance with a steering angle of the vehicle;

a second processor core configured to superpose the guide line image on a reference image based on a capturing result from a camera mounted on the vehicle, to output the reference image superposed with the guide line image to a display device as a display image; and a memory that holds a plurality of guide line images generated by the first processor core with respect to a plurality of steering angles, wherein
when the first processor core has not completed start-up, the second processor core outputs the display image generated using one of the plurality of guide line images read from the memory by the second processor core in accordance with steering angle information indicating a current steering angle of the vehicle, and
when the first processor core has completed the start-up, the second processor core outputs the display image generated using the guide line image generated in real time by the first processor core in accordance with the steering angle information.

\* \* \* \* \*